(12) United States Patent
Suzuki et al.

(10) Patent No.: US 6,887,174 B2
(45) Date of Patent: May 3, 2005

(54) HYDRAULIC PRESSURE CONTROL APPARATUS

(75) Inventors: Fuminori Suzuki, Okazaki (JP); Motoyoshi Ando, Nagoya (JP)

(73) Assignee: Denso Corporation (JP)

( * ) Notice: Subject to any disclaimer, the term of this patent is extended or adjusted under 35 U.S.C. 154(b) by 127 days.

(21) Appl. No.: 10/207,841

(22) Filed: Jul. 31, 2002

(65) Prior Publication Data

US 2003/0027673 A1 Feb. 6, 2003

(30) Foreign Application Priority Data

| Aug. 6, 2001 | (JP) | 2001-237520 |
| Aug. 6, 2001 | (JP) | 2001-237551 |
| Aug. 6, 2001 | (JP) | 2001-237567 |
| May 16, 2002 | (JP) | 2002-140932 |

(51) Int. Cl.$^7$ .............................. F16H 59/00
(52) U.S. Cl. .............................. 474/28
(58) Field of Search .............................. 474/28

(56) References Cited

U.S. PATENT DOCUMENTS 3,897,342 A * 7/1975 Schmid et al. ............... 210/445
4,113,627 A * 9/1978 Leason ........................ 210/446
4,663,991 A * 5/1987 Nakamura et al. ............ 477/49
4,826,598 A * 5/1989 Cain ............................ 210/445
5,853,437 A * 12/1998 Peter et al. .................. 55/282.3
5,954,933 A * 9/1999 Ingalls et al. ................ 204/557
6,533,072 B2 * 3/2003 Hori ............................ 184/6.25

FOREIGN PATENT DOCUMENTS

| DE | 199 55 603 | 2/2001 |
| JP | 05329311 A * | 12/1993 | ........ B01D/35/06 |

* cited by examiner

Primary Examiner—David A. Bucci
Assistant Examiner—Bradley J. Van Pelt
(74) Attorney, Agent, or Firm—Nixon & Vanderhye PC

(57) ABSTRACT

A hydraulic pressure control apparatus has an actuator for controlling an automatic transmission. A case for receiving the actuator is constituted by an upper case, a lower case and a plate interposed between them. The plate is provided with a filter. The filter protects the actuator from foreign matters. The actuator is inserted into the case along the axial direction. The actuator is locked by a rotating operation or fixed by a snap fit. An electric control unit is laminated in parallel to the case regulating an oil passage. The electric control unit is cooled by fluid. The electric control unit has a liquid level sensor in its connector part.

7 Claims, 27 Drawing Sheets

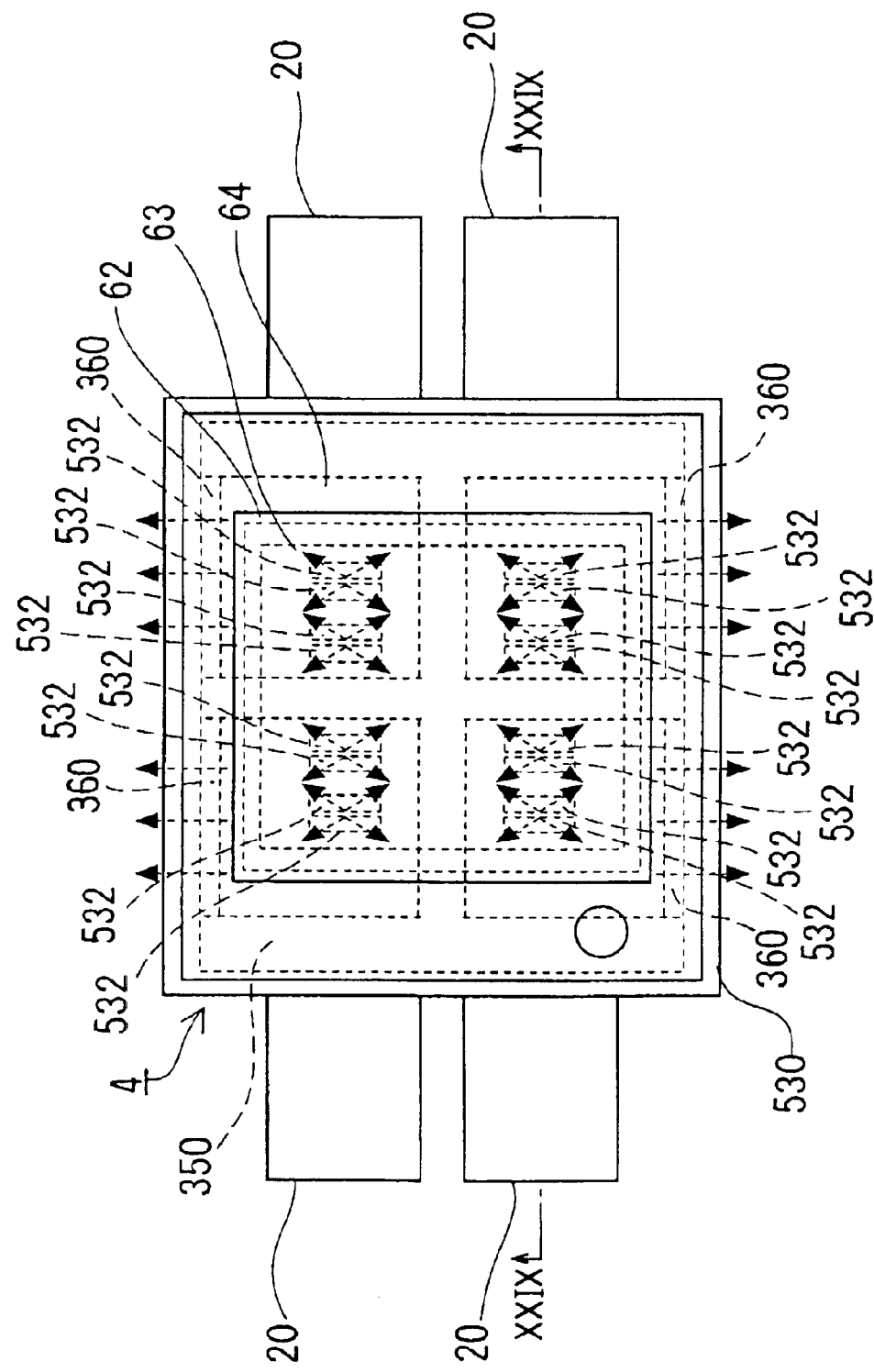

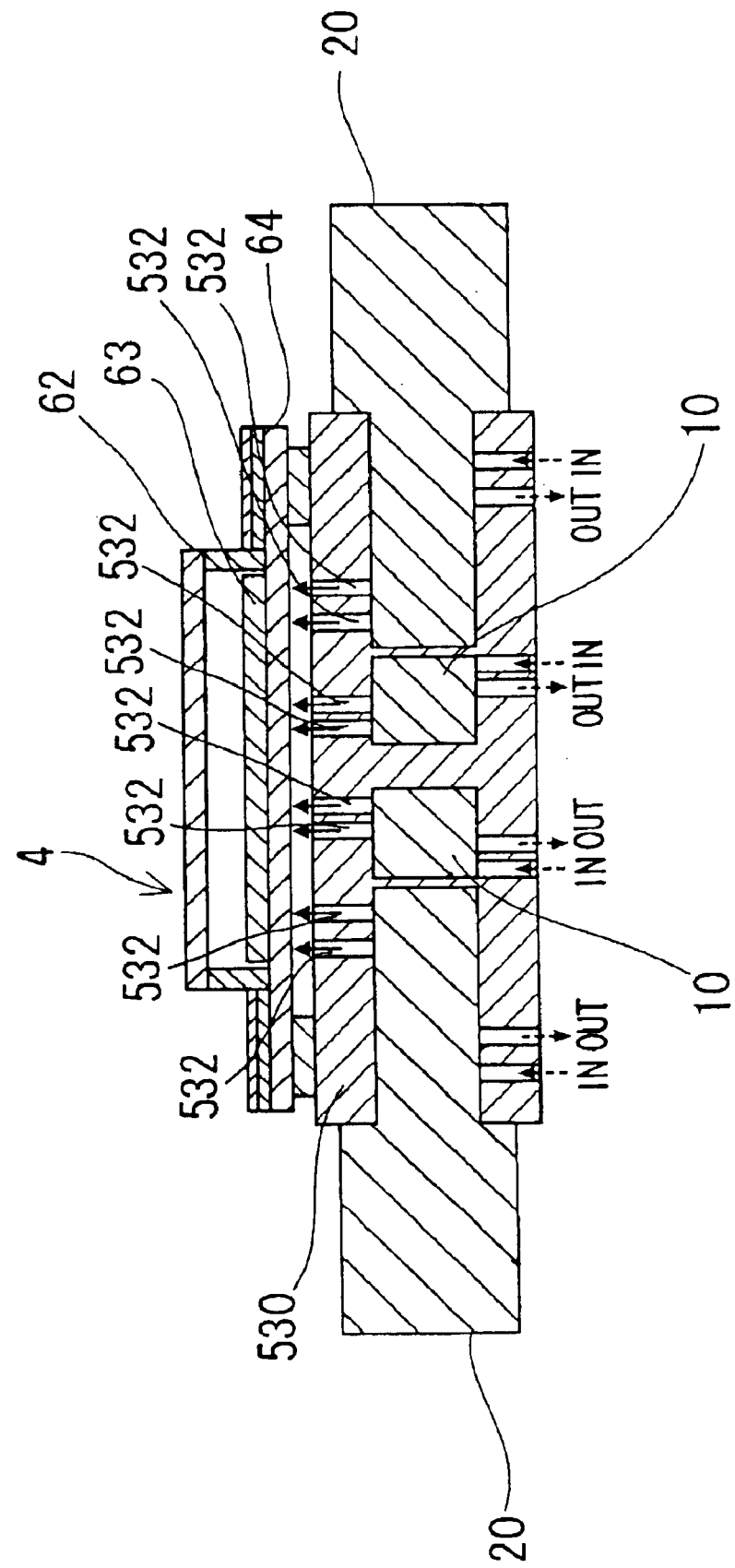

HYDRAULIC PRESSURE CONTROL APPARATUS

CROSS REFERENCE TO RELATED APPLICATION

This application is based on Japanese Patent Applications No. 2001-237520 filed on Aug. 6, 2001, No. 2001-237551 filed on Aug. 6, 2001, No. 2001-237567 filed on Aug. 6, 2001, and No. 2002-140932 filed on May 16, 2002 the contents of which are incorporated herein by reference.

BACKGROUND OF THE INVENTION

1. Field of the Invention

The present invention is related to an apparatus for controlling hydraulic pressure and can be used, for example, for a transmission mechanism for a vehicle such as an automatic transmission or a continuously variable transmission.

2. Related Art

Transmission mechanisms used for automobiles include a transmission called an automatic transmission or a continuously variable transmission. This transmission mechanism has actuators such as a hydraulic pressure type cylinder, valve, and accumulator, and a solenoid valve, and controls a transmission gear ratio by these hydraulic pressure type actuators and the solenoid valve. The transmission mechanism uses hydraulic pressure as fluid. Further, the transmission mechanism is constituted by a transmission unit, a solenoid valve unit, and an electric control unit (ECU).

German Patent No. DE19955603C1 discloses a hydraulic control module in which an ECU and an actuator are integrally arranged.

However, an transmission mechanism in the related art presents such a problem that it has a large number of components, increases in size and requires a large number of manufacturing man-hours.

SUMMARY OF THE INVENTION

The present invention provides an improved hydraulic pressure control apparatus.

One object of the present invention is to provide a hydraulic pressure control apparatus capable of controlling hydraulic pressure with high accuracy.

Another object of the present invention is to provide a hydraulic pressure control apparatus having an improved structure for trapping foreign matters.

Still another object of the present invention is to provide a hydraulic pressure control apparatus having an improved structure for fixing an actuator.

Still another object of the present invention is to provide a hydraulic pressure control apparatus having an improved electric control unit.

Still another object of the present invention is to provide a hydraulic pressure control apparatus having an improved structure for fixing an electric control unit.

Still another object of the present invention is to provide a hydraulic pressure control apparatus having an improved structure for sealing an electric control unit.

Still another object of the present invention is to provide a hydraulic pressure control apparatus having an improved structure for cooling an electric control unit.

Still another object of the present invention is to provide a hydraulic pressure control apparatus having an improved structure for supporting a level sensor.

According to the first aspect of the present invention, a plate member is interposed between the upper case and the lower case of a fluid pressure control apparatus and the plate member is provided with filtering member which filters fluid flowing a fluid passage. For this reason, foreign matters produced in the fluid passage or foreign matters remaining in the fluid passage when the cases and plate are assembled are trapped by the filtering member. Therefore, this makes it possible to control a fluid pressure with high accuracy. Further, since this eliminates the need for providing a sub-filter separately, this can reduce the number of components and assembling man-hours and hence reduce manufacturing costs.

According to the second aspect of the present invention, a control valve and an actuator are mounted side by side in the mounting hole made in a valve body. A pin is inserted into the valve body in the direction perpendicular to the axial direction of the actuator and the control valve by the use of the first slit. The actuator is rotated such that the small-diameter portion of the pin is opposed to the outside wall of the second slit. The actuator is pressed onto the opening part side of the mounting hole by the urging force of urging means via the control valve, so that the small-diameter portion of the pin is put into contact with the outside wall of the second slit to thereby fix the actuator to the valve body. At this time, in the second slit, an opening width in the axial direction is smaller than the diameter of the large-diameter portion of the pin. Thus, this can prevent the pin from coming off.

Therefore, the actuator can be fixed to the valve body by a simple constitution. This eliminates the need for providing a bracket and a bolt and hence can reduce the number of components.

When the components are assembled, it is not necessary to apply grease or the like to prevent a pin from dropping to the components. This facilitates the assembling work and reduces assembling man-hours, and thus reduces manufacturing costs.

Further, in the case of inspecting and replacing the actuator, the actuator can be easily removed from the valve body by rotating the actuator about its axis while pressing the actuator in the direction opposite to the urging force of urging means. Therefore, this eliminates the need for disassembling the valve body, facilitates the maintenance work and hence improves maintainability.

According to the third aspect of the present invention, there is provided connection means that joins a bus bar to a case for receiving an actuator by a snap fit to thereby fix the actuator to the case. Therefore, this eliminates the need for providing a member such a pin, a bracket, a bolt or the like and hence can reduce the number of components and fix the actuator to the case by a simple constitution. Further, utilizing the snap fit of the connection means in assembling the components facilitates the assembling work and reduces assembling man-hours and manufacturing costs.

According to the fourth aspect of the present invention, there is provided connection means that fixes an actuator to a case by a snap fit. Thus, this eliminates the need for providing a member such as a pin, a bracket, or the like and hence can reduce the number of components and fix the actuator to the case by a simple constitution. Further, utilizing the snap fit of the connection means in assembling the components facilitates assembling work and reduces assembling man-hours and manufacturing costs. Still further, since the actuator can be easily removed from the case without removing a bus bar from the case, the case doesn't need to be disassembled. Thus, this facilitates the maintenance work and improves maintainability.

According to the fifth aspect of the present invention, an actuator and a control unit are arranged in a laminated manner, so it is easy to reduce the size of an apparatus and to ensure a mounting space. Therefore, it is possible to produce an effect of easily mounting the apparatus in a limited space and facilitating the assembling work and the maintenance work of the apparatus. Here, signal detecting means for detecting a signal necessary for controlling a hydraulic pressure includes a rotary sensor, a fluid temperature sensor and the like.

According to the sixth aspect of the present invention, a sealing member for sealing the control unit inside is fitted in a joining member that joins a control unit to a case for receiving an actuator, and a terminal for electrically connecting the control unit to the actuator is inserted into the joining member. At the fitting part of the sealing member and the joining member are provided a close contact part and a gap part and at a portion where the terminal is inserted into the joining member is provided a labyrinth structure.

For this reason, when an adhesive or the like is applied to the fitting part in assembling components, the adhesive is stored in the gap part and is prevented from flowing to the substrate mounting side of the control unit by the close contact part. Further, the labyrinth structure elongates a passage through which a working fluid enters the portion where the terminal is inserted into the joining member to thereby prevent the working fluid from entering the control unit. Still further, a stress produced by a difference in the coefficient of thermal expansion between the terminal and the joining member during a heating and cooling cycle is relaxed by the labyrinth structure. Therefore, it is possible to prevent the working fluid from entering the control unit and thus to ensure the hermetic property of the control unit without using a member such as a gasket or the like. This can ensure reliability by a simple constitution and reduce the number of components.

According to the seventh aspect of the present invention, heat produced in a control unit is transmitted to a case via a connecting member from a plate bonded to a substrate. Further, working fluid discharged from the actuator is splashed on the plate bonded to the substrate by fluid splashing means, whereby the heat is transmitted from the plate bonded to the substrate to the working fluid. Therefore, this eliminates the need for providing a member such as a cooling fan or the like and can improve cooling performance of the control unit. In this manner, it is possible to ensure reliability by a simple constitution and to reduce the number of components.

According to the eighth aspect of the present invention, a connector for taking out the control signal of a control unit is provided with level detecting means for detecting the amount of working fluid. This makes it possible to detect the amount of working fluid with high accuracy and to facilitate the level control of the working fluid, thereby improving maintainability.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

FIG. 28 is a plan view of a hydraulic module in accordance with the tenth embodiment of the present invention;

FIG. 29 is a cross-sectional view of a hydraulic module in accordance with the tenth embodiment of the present invention, and shows a cross-sectional view taken along a line XXIX—XXIX of FIG. 28;

DETAILED DESCRIPTION OF PREFERRED EMBODIMENTS (First Embodiment)

Figure 1:
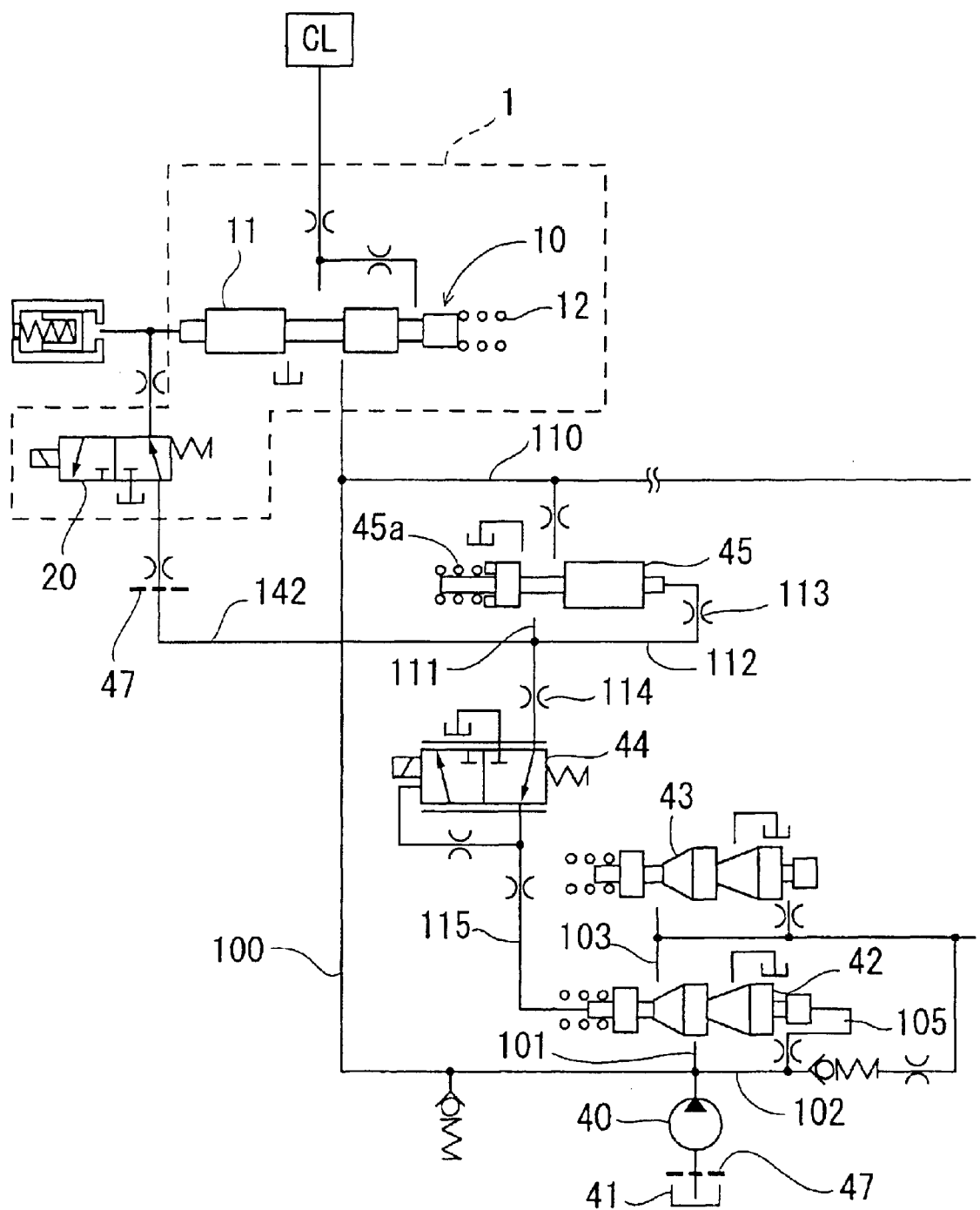
FIG. 1 is a hydraulic circuit diagram in accordance with the first embodiment of the present invention.
Figure 2:
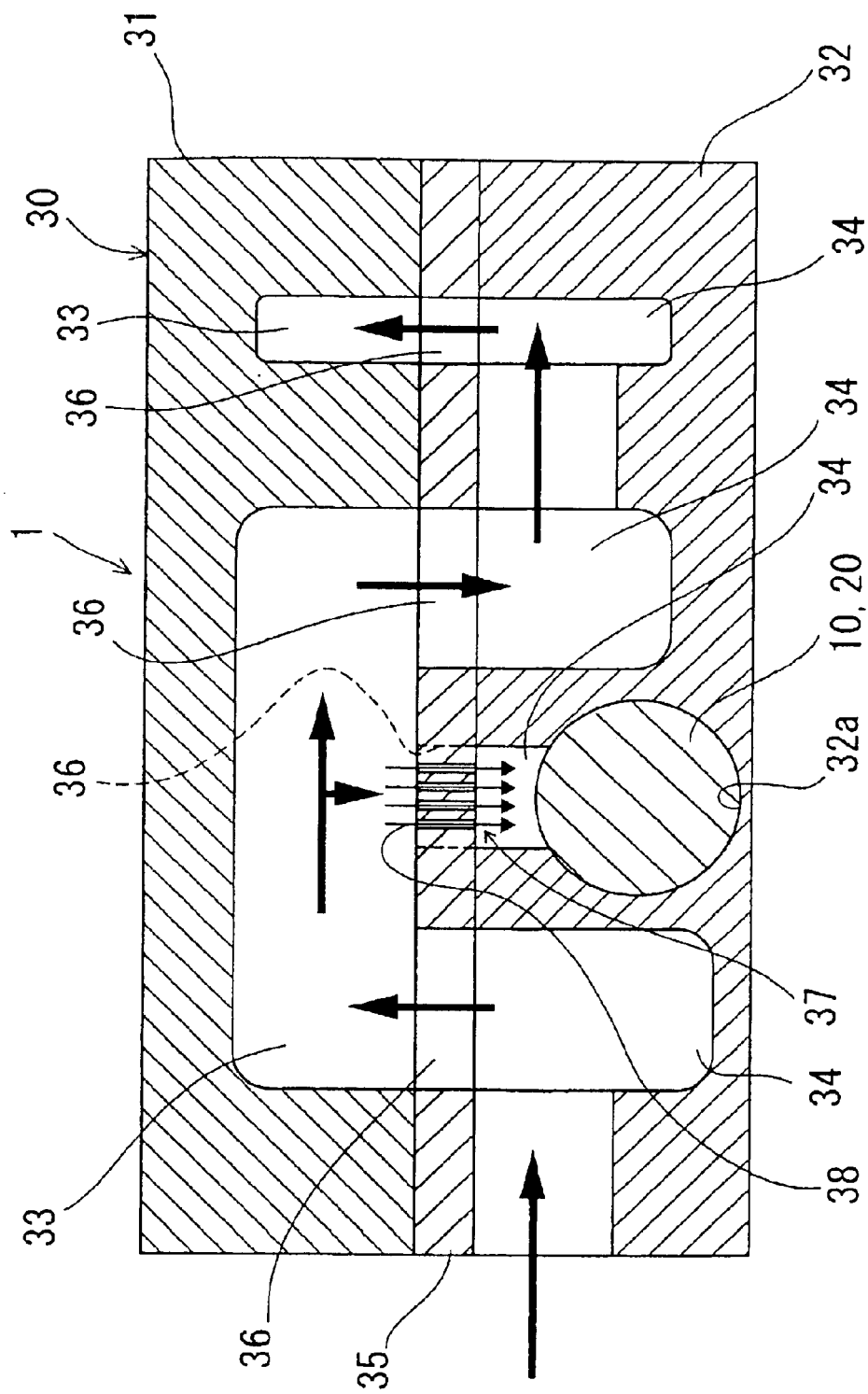
FIG. 2 is a cross-sectional view of a hydraulic module in accordance with the first embodiment of the present invention.
Figure 3:
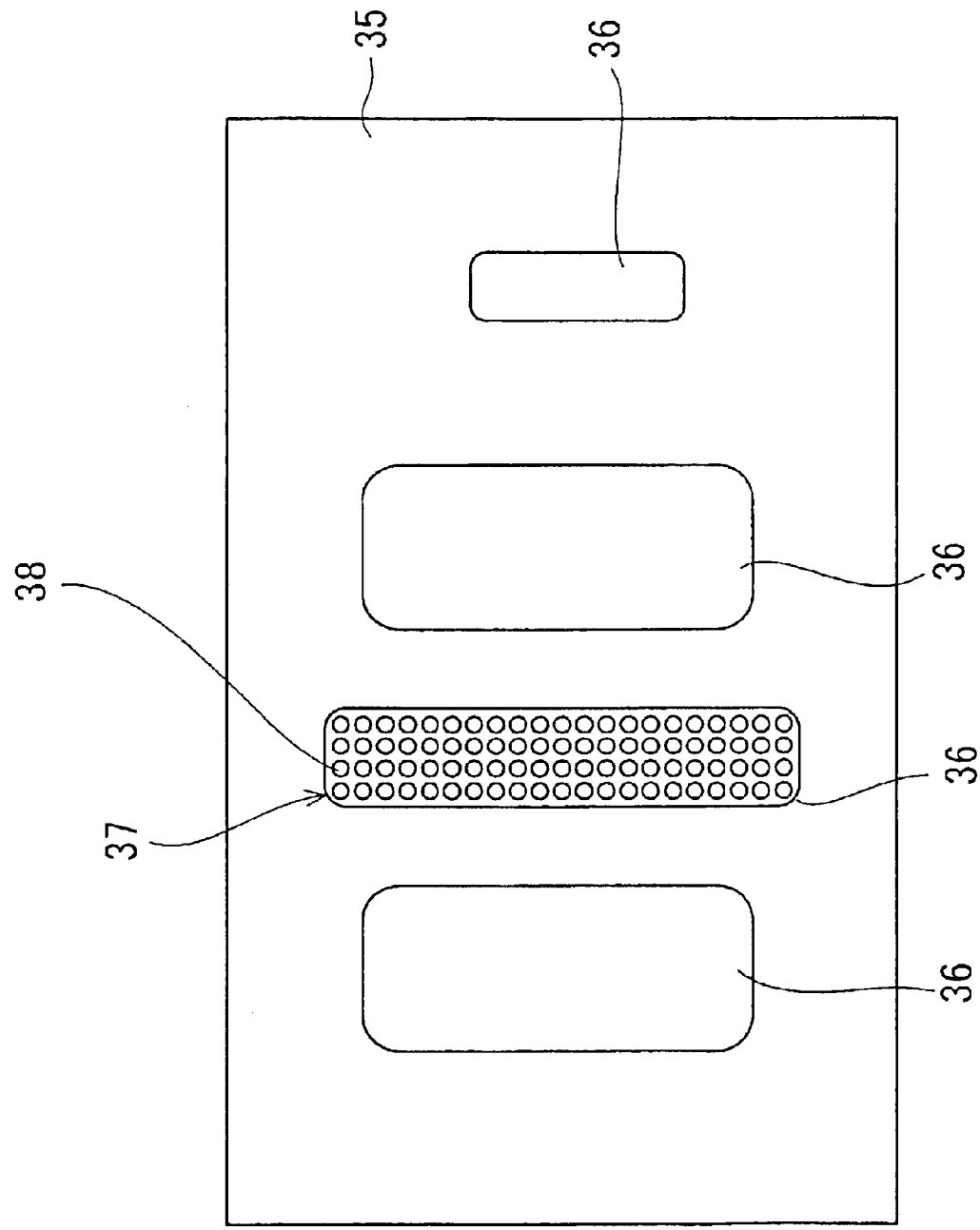
FIG. 3 is a plan view of a component of a hydraulic module in accordance with the first embodiment of the present invention.

The first embodiment in which a hydraulic pressure control apparatus in accordance with the present invention is applied to a hydraulic pressure control apparatus for an automatic transmission will be shown in FIG. 1, FIG. 2 and FIG. 3.

A hydraulic pump 40 shown in FIG. 1 pumps a working fluid from an oil pan 41 and supplies the working fluid to a plurality of friction elements such as a reverse clutch (R/C), an overdrive clutch (H/C), a 2-4 brake (2-4/B), an underdrive clutch (L/C), a low reverse clutch (LR/C), a transfer clutch (TRF) and the like. A line pressure control valve 42 produces the working pressure of the respective friction elements in conjunction with a secondary valve 43 on the basis of the command pressure of a solenoid valve 44. A pressure reducing valve 45 reduces a line pressure produced by the line pressure control valve 42. The hydraulic pump 40, the line pressure control valve 42, and the solenoid valve 44 constitute original pressure producing means for producing an original pressure applied to the respective friction elements. In the embodiment, the working fluid is an automatic transmission fluid.

A clutch pressure control valve 10 and a solenoid valve 20 constitute friction element control means for controlling a hydraulic pressure applied to the respective friction elements other than the R/C, respectively. Here, the clutch pressure control valve 10 constitutes a control valve and the solenoid valve 20 is a linear solenoid valve and constitutes an actuator. In the first embodiment, to control a clutch pressure, there is provided a hydraulic module 1 as a hydraulic pressure control means in which the clutch control valve 10 is integrated with the solenoid valve 20. In FIG. 1, the output pressure of the clutch pressure control valve 10 is controlled by applying a command pressure, which is the output pressure of the solenoid valve 20, to the left-hand end of the clutch pressure control valve 10. The clutch pressure control valve 10 has a spool 11 and a spring 12. The solenoid valve 20 has a solenoid part (not shown) for driving a valve body (not shown) according to a switching control signal from an ECU (Electric Control Unit, not shown). Here, on the upstream side of the hydraulic module 1 described above is provided a main filter 47.

As shown in FIG. 2 and FIG. 3, the clutch pressure control valve 10 and the solenoid valve 20 are mounted in one valve body 30 to constitute a hydraulic module 1. It is also recommended that a plurality of hydraulic modules be integrated in the valve body 30.

The aluminum-die-cast valve body 30 is constituted by an upper valve body 31 as an upper case, a lower valve body 32 as a lower case, and a separate plate 35 as a plate member. The upper valve body 31 has an inside wall for forming a passage 33 to flow the working fluid and the lower valve body 32 has an inside wall for forming a passage 34 to flow the working fluid. A mounting hole 32a is formed in the lower valve body 32 and the clutch pressure control valve 10 and the solenoid valve 20 are mounted coaxially with the mounting hole 32a. That is, the clutch pressure control valve 10 and the solenoid valve 20 are mounted side by side in the axial direction. Further, it is also recommended that the clutch pressure control valve 10 and the solenoid valve 20 be not mounted coaxially with each other but be mounted separately from each other.

The separate plate 35 is a member that is interposed between the upper valve body 31 and the lower valve body 32 to allow or interrupt the communication between the passage 33 and the passage 34. In the separate plate 35 are formed a plurality of communication holes 36 that makes the passage 33 communicate with the passage 34. At the communication hole 36 directly on the upstream side of the clutch pressure control valve 10 or the solenoid valve 20 is provided a filtering part 37 as a filtering means. The filtering part 37 traps foreign matters produced sporadically in the working fluid or foreign matters remaining in the passage 33 and the passage 34 when the components are assembled, and has a plurality of through holes 38 made in the separate plate 35 by a laser. The number of through holes 38 is determined appropriately according to the kind of vehicle, and it is desirable that the diameter of the through hole 38 is a value small enough not to degrade a responsive ability at extremely low temperatures, and a value of from 0.02 mm to 0.2 mm is adopted as the diameter of the through hole 38. Forming the through holes 38 by a laser makes it possible to form many small-diameter through holes precisely and quickly. Here, the diameter of the through hole 38 is larger than diameter of the main filter 47 shown in FIG. 1. Arrows shown in FIG. 2 show the flow of the working fluid. The passage 34 is connected to a communication passage 142 shown in FIG. 1.

The operation of the first embodiment will be described below.

The working fluid is sucked from the oil pan 41 by the hydraulic pump 40 and is discharged at high pressure to the communication passages 100, 101, and 102. The line pressure control valve 42 discharges a part of working fluid carried through the communication passage 101 to the communication passage 103 to thereby control a line pressure.

A communication passage 110 branched from the communication passage 100 is provided with the pressure reducing valve 45. The working fluid discharged by the pressure reducing valve 45 is discharged through a communication passage 111 and introduced into the right-hand end of the pressure reducing valve 45 through a restrictor 113 of a communication passage 112. The pressure in the communication passage 111 is controlled to a pressure not exceeding a line pressure, for example, about 0.5 MPa, if we assume that the maximum line pressure is 1.7 MPa, by the balance between the force that the pressure reducing valve 45 receives from the discharge pressure of the working fluid introduced through the right-hand end and the urging force of a spring 45a. This pressure is called a modulation pressure.

The working fluid controlled to the modulation pressure by the pressure reducing valve 45 is introduced through a restrictor 114 into the solenoid valve 44. The solenoid valve 44 is duty-ratio controlled by an output signal from the ECU in such a way as to set an appropriate line pressure according to the operating conditions of a vehicle such as a throttle opening, an engine torque, a turbine torque and the like. The command pressure of the solenoid valve 44 is transferred through the communication passage 115 to the left end of the line pressure control valve 42. The working fluid of the line pressure is introduced through a communication passage 105 branched from the communication passage 102 of the line pressure to a part that is formed on the right side of the line pressure control valve 42 and has a different diameter to balance with the command pressure of the solenoid valve 44 to thereby feed back the line pressure.

A communication passage 142 is branched from the communication passage 111 and is connected to the solenoid valve 20. The output of the solenoid valve 20 is connected to the left-hand end of the clutch pressure control valve 10. The solenoid valve 20 controls an output pressure in accordance with the command of the ECU. As a result, the solenoid valve 20 controls a pressure applied to the left-hand end of the clutch pressure control valve 10. The clutch pressure control valve 10 receives the pressure of the communication passage 100, the pressure controlled by the solenoid valve 20, and the urging force of the spring 12. The clutch pressure control valve 10 controls a pressure applied to the respective friction elements by the balance of these forces. That is, the clutch pressure control valve 10 controls the pressure applied to the respective friction elements in accordance with the pressure controlled by the solenoid valve 20.

At this time, the foreign matters sporadically produced in the working fluid and the foreign matters remaining in the passage 33 of the upper valve body 31 and in the passage 34 of the lower valve body 32 when the upper and lower valve bodies 33, 34 are assembled are moved with the flow of the working fluid to the side of the clutch pressure control valve 10 and the solenoid valve 20. In the case where the foreign matters are larger than the diameter of the through hole 38 of the filtering part 37, they can not pass through the though holes 38 but are trapped by the filtering part 37, whereas in the case where the foreign matters are smaller than the diameter of the through hole 38 of the filtering part 37, they might pass through the though holes 38 but if they are shaped like whiskers, they are hard to pass through the through hole 38.

Figure 7:
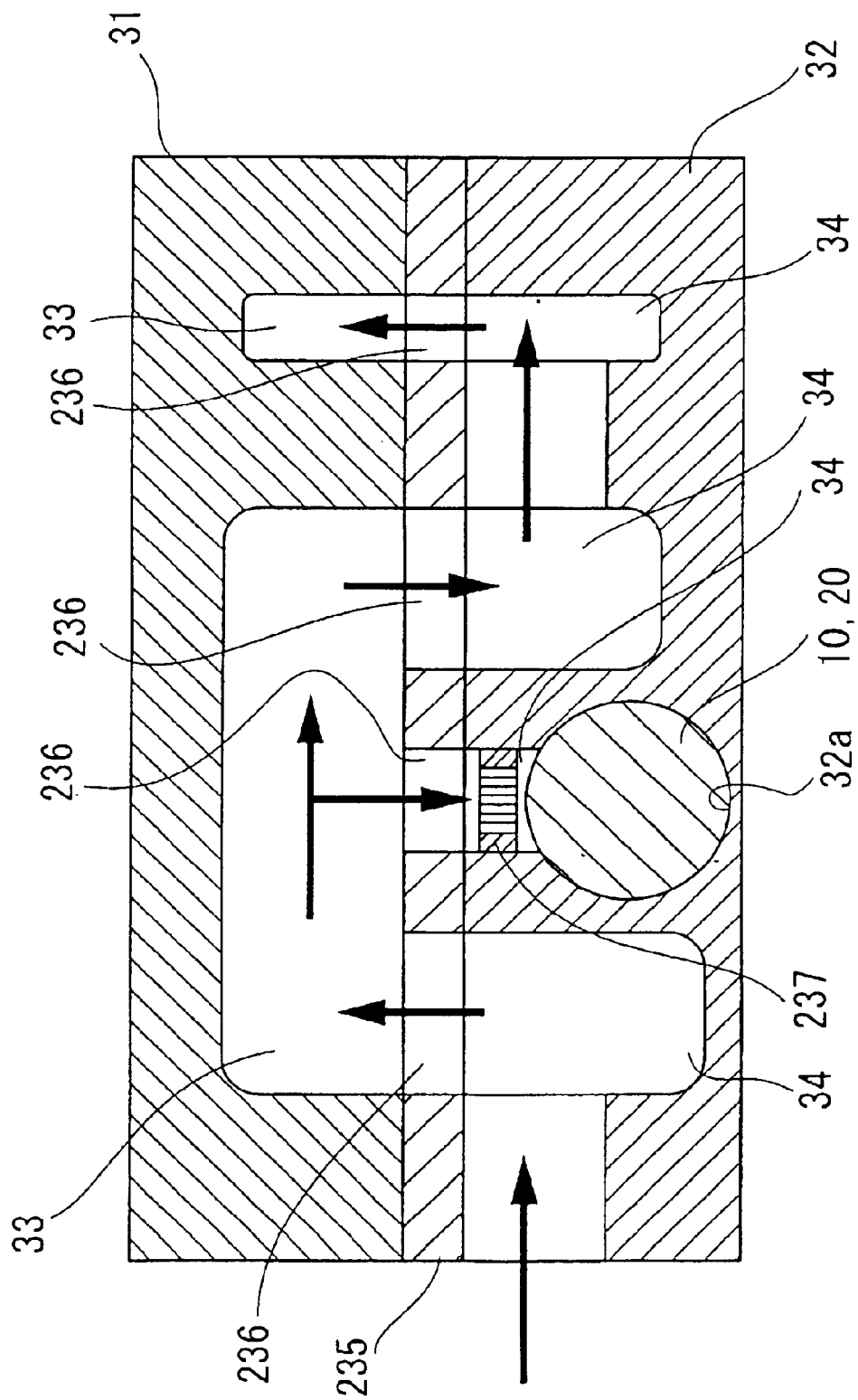
FIG. 7 is a cross-sectional view of a hydraulic module relating to a comparative example.
Figure 8:
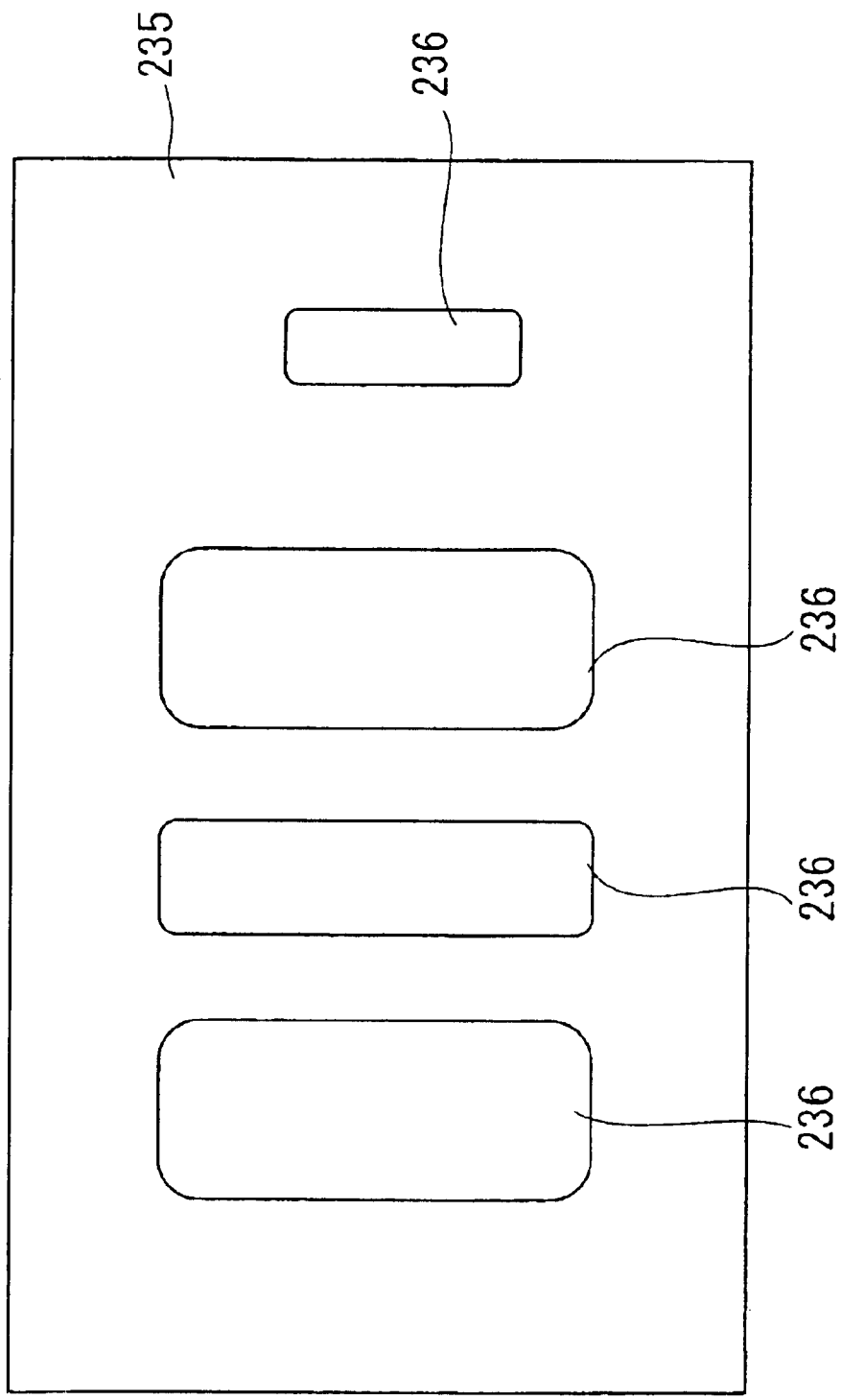
FIG. 8 is a plan view of a component of a hydraulic module relating to a comparative example.

FIG. 7 and FIG. 8 show comparative examples. The substantially same constituent parts as those in the first embodiment are denoted by the same reference characters.

As shown in FIG. 7 and FIG. 8, in a separate plate 235 are formed a plurality of communication holes 236 communicating with a passage 33 formed in an upper valve body 31 and a passage 34 formed in a lower valve body 32. In the passage 34 is provided a sub-filter 237.

In the comparative example, the sub-filter 237 having a hole diameter larger than a main filter 47 needs to be provided separately in an oil passage. Thus, the comparative example presents a problem of increasing the number of components and man-hours required for mounting the sub-filter and hence increasing manufacturing costs.

In the first embodiment, the filtering part 37 is provided in the communication hole 36 directly at the upstream side of the clutch pressure control valve 10 or the solenoid valve 20 of the separate plate 35. Thus, the filtering part 37 prevents the foreign matters from entering the clutch pressure control valve 10 and the solenoid valve 20 to improve the reliability of a hydraulic control, thereby controlling the working fluid with high accuracy. Further, since it is not necessary to provide a sub-filter separately in the oil passage, it is possible to reduce the number of components and assembling man-hours and hence manufacturing costs.

Further, in the filtering part 37, the plurality of through holes 38 are formed in the separate plate 35 by the use of a laser, so that it is possible to form the plurality of through holes 38 each having an appropriate hole diameter precisely and easily. Therefore, it is possible to improve the machining accuracy of the filtering part 37 and to reduce the machining man-hours.

(Second Embodiment)

Figure 4:
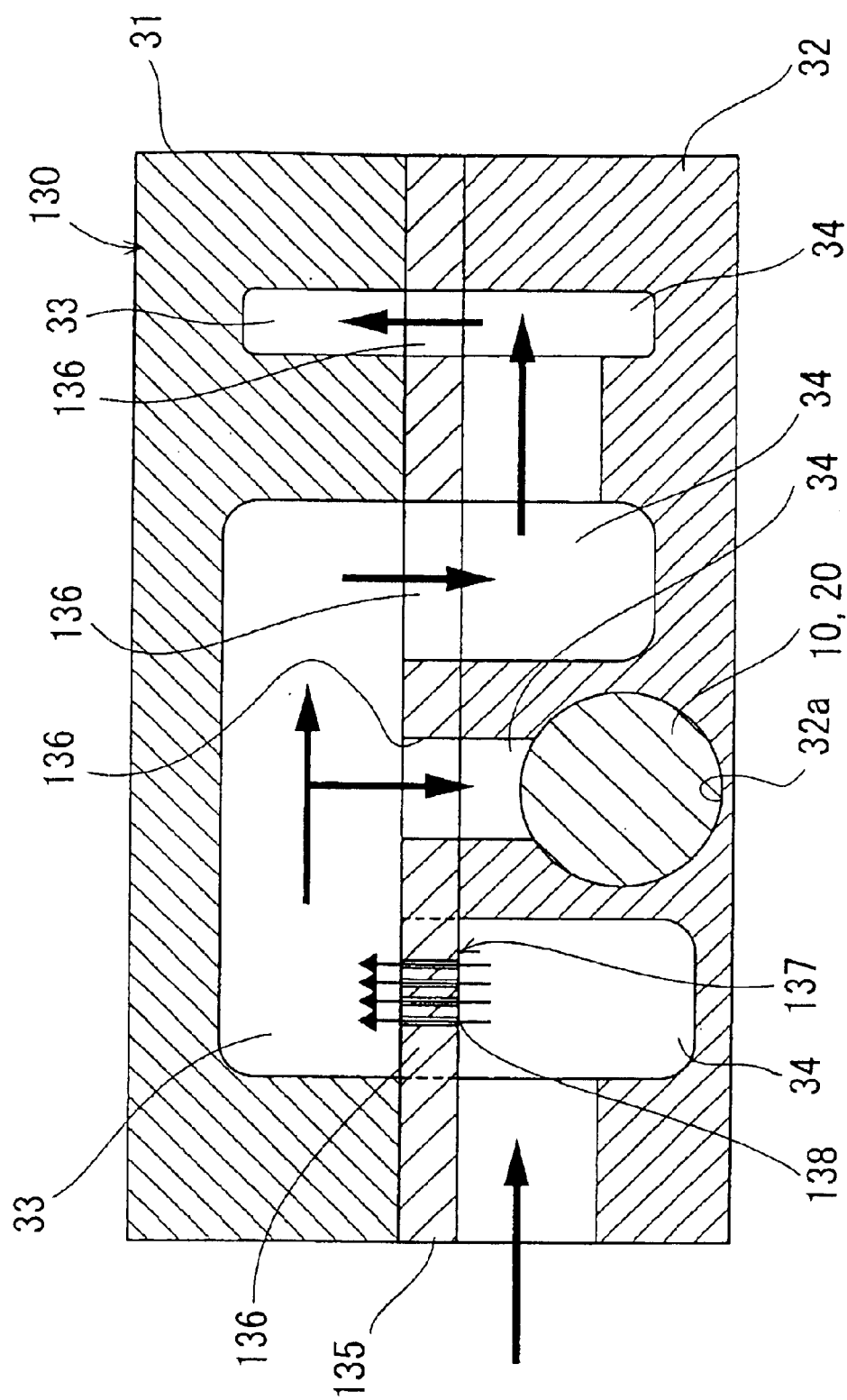
FIG. 4 is a cross-sectional view of a hydraulic module in accordance with the second embodiment of the present invention.

The second embodiment will be shown in FIG. 4. In the following embodiment, the substantially same constituent parts as those in the preceding embodiment will be denoted by the same reference characters and their descriptions will not be repeated.

As shown in FIG. 4, in a separate plate 135 are formed a plurality of communication holes 136 that communicate with a passage 33 formed in an upper valve body 31 and a passage 34 formed in a lower valve body 32. A filtering part 137 functioning as a filtering means is provided in a communication hole 136 formed in the separate plate 135 at the position where the working fluid is first introduced into a valve body 130 constituted by the upper valve body 31 and the lower valve body 32. The filtering part 137 has a plurality of through holes 138. The filtering part 137 and the through holes 138 are formed in the same manner as the filtering part 37 and the through hole 38 in the first embodiment.

(Third Embodiment)

Figure 5:
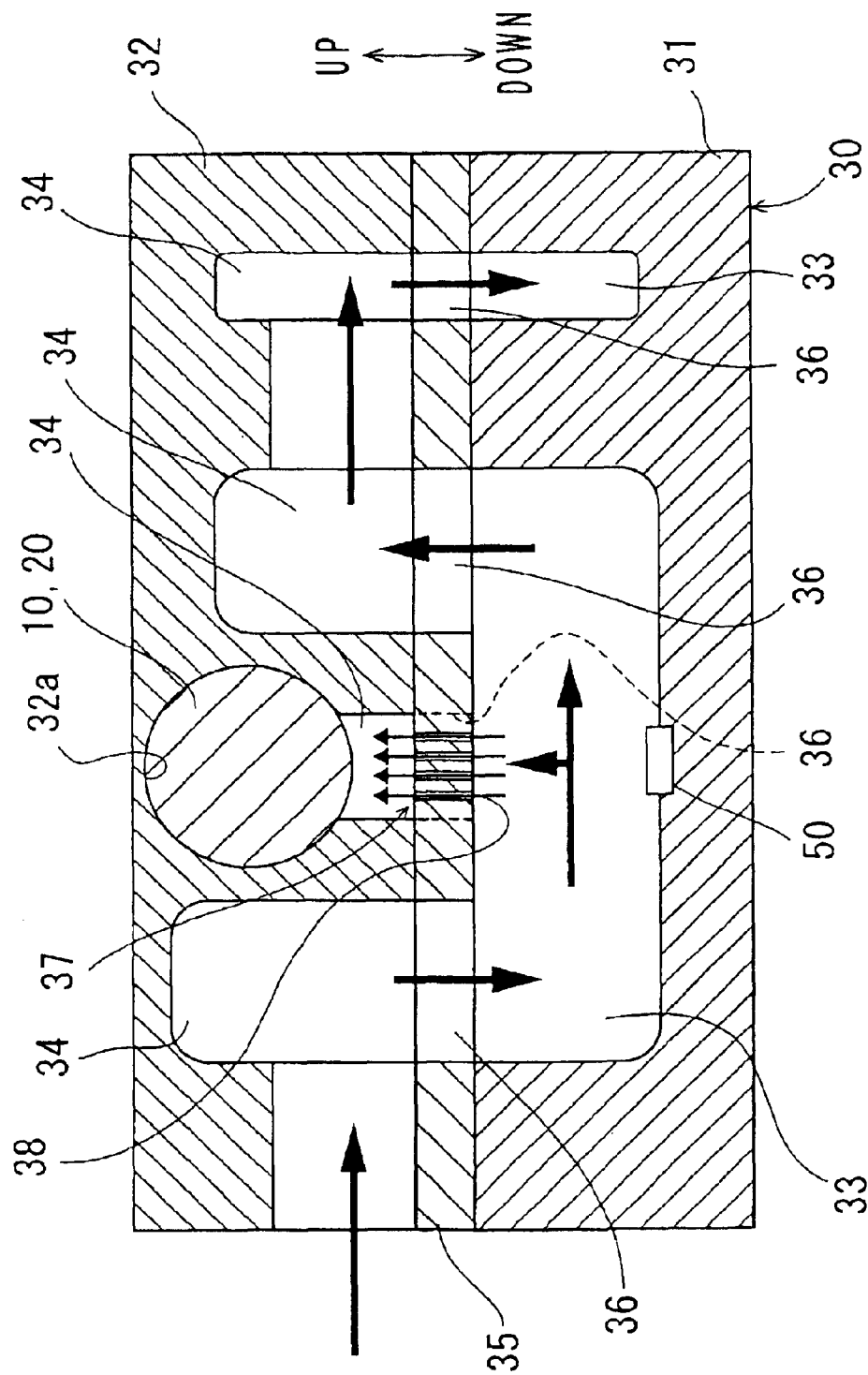
FIG. 5 is a cross-sectional view of a hydraulic module in accordance with the third embodiment of the present invention.

The third embodiment will be shown in FIG. 5. As shown in FIG. 5, in the third embodiment, parts are mounted upside down with respect to the first embodiment. Further, a magnet 50 is mounted on the inside wall on the ground side opposite to the filtering part 37.

The third embodiment having the above-mentioned constitution can also produce the same effect as the first embodiment.

Further, in the third embodiment, the magnet 50 is mounted on the inside wall of the upstream side passage 33 of the filtering part 37, so that the iron-based foreign matters trapped by the filtering part 37 drop under its own weight after the operation is stopped, and the dropped foreign matters can be recovered by the magnetic force of the magnet 50. Therefore, it is possible to surely trap the foreign matters in the working fluid and to improve reliability.

(Fourth Embodiment)

Figure 6:
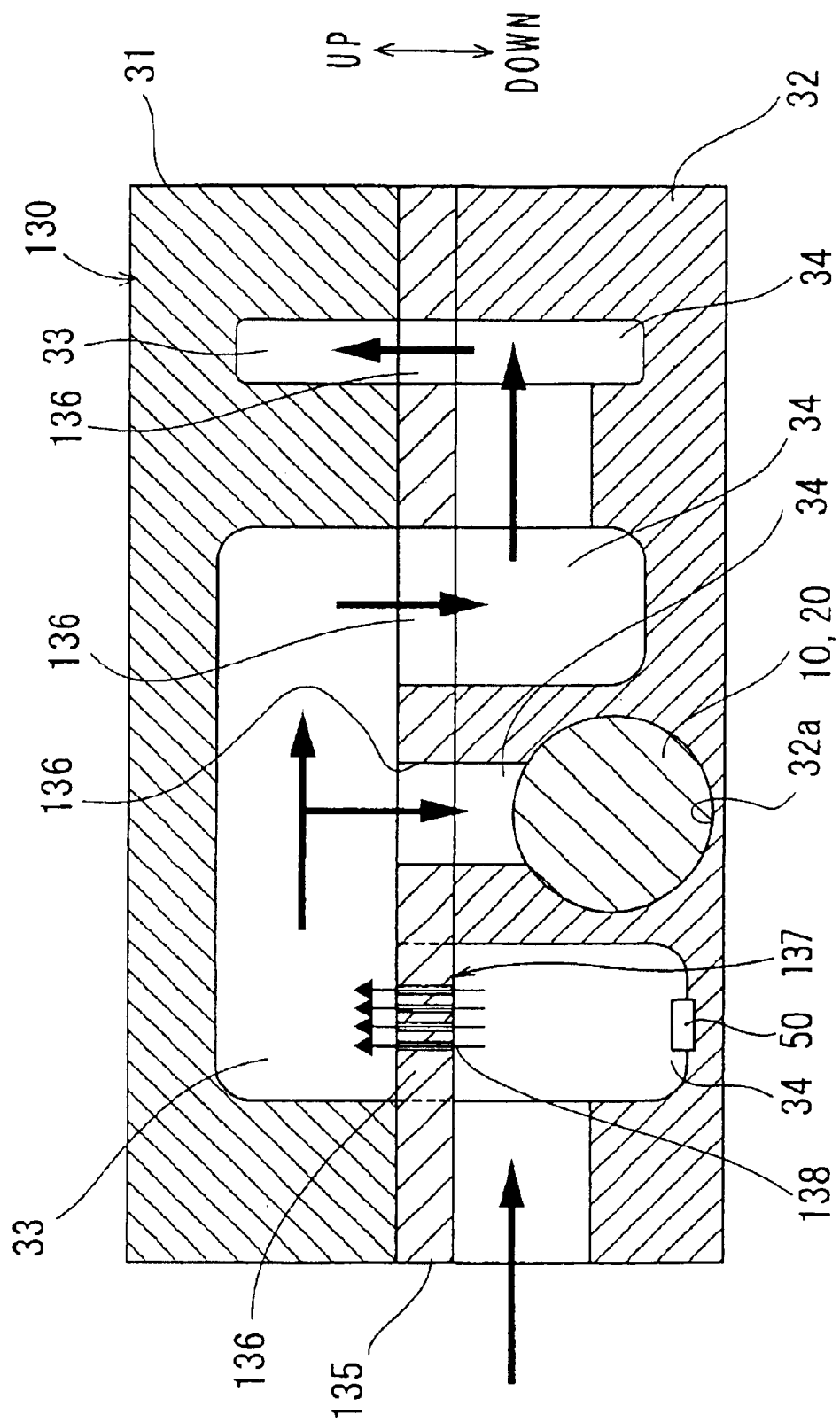
FIG. 6 is a cross-sectional view of a hydraulic module in accordance with the fourth embodiment of the present invention.

Next, the fourth embodiment will be shown in FIG. 6. As shown in FIG. 6, in the fourth embodiment, parts are mounted upside down with respect to the third embodiment. In the fourth embodiment, the magnet 50 is mounted on the inside wall of the upstream side passage 34 of the filtering part 137, so that the iron-based foreign matters trapped by the filtering part 37 drop under its own weight after the operation is stopped, and the dropped foreign matters can be recovered by the magnetic force of the magnet 50. Therefore, it is possible to surely trap the foreign matters in the working fluid and to improve reliability.

The structures described in the first embodiment to the fourth embodiment are used also in the fifth embodiment to the eleventh embodiment.

(Fifth Embodiment)

Figure 9:
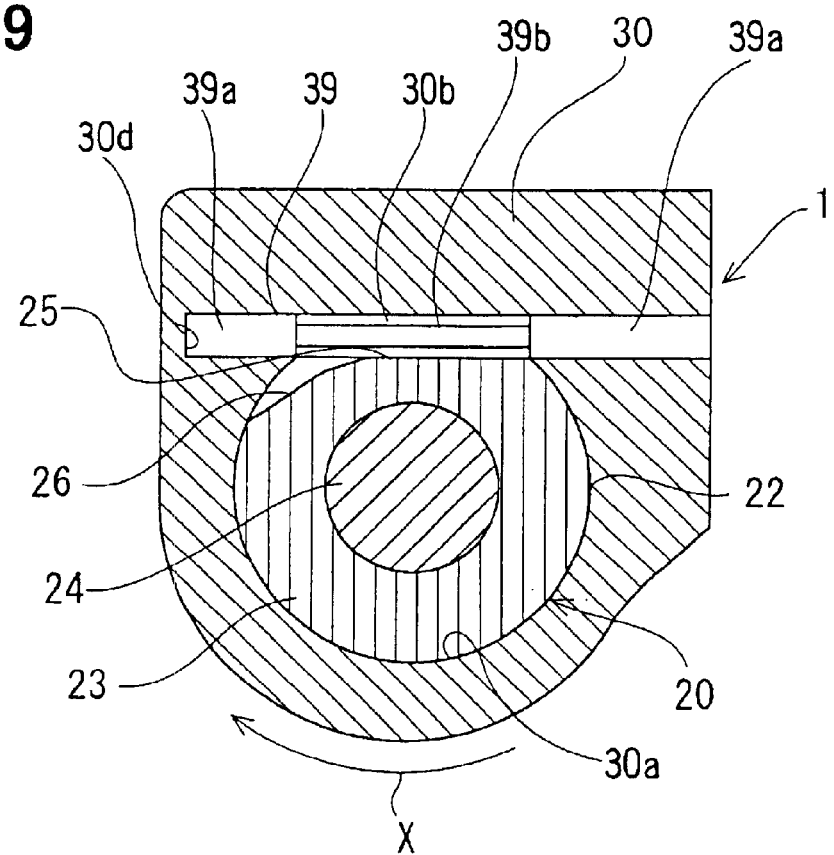
FIG. 9 is a cross-sectional view of a hydraulic module in accordance with the fifth embodiment of the present invention, and shows a cross-sectional view taken along a line IX—IX of FIG. 10.
Figure 10:
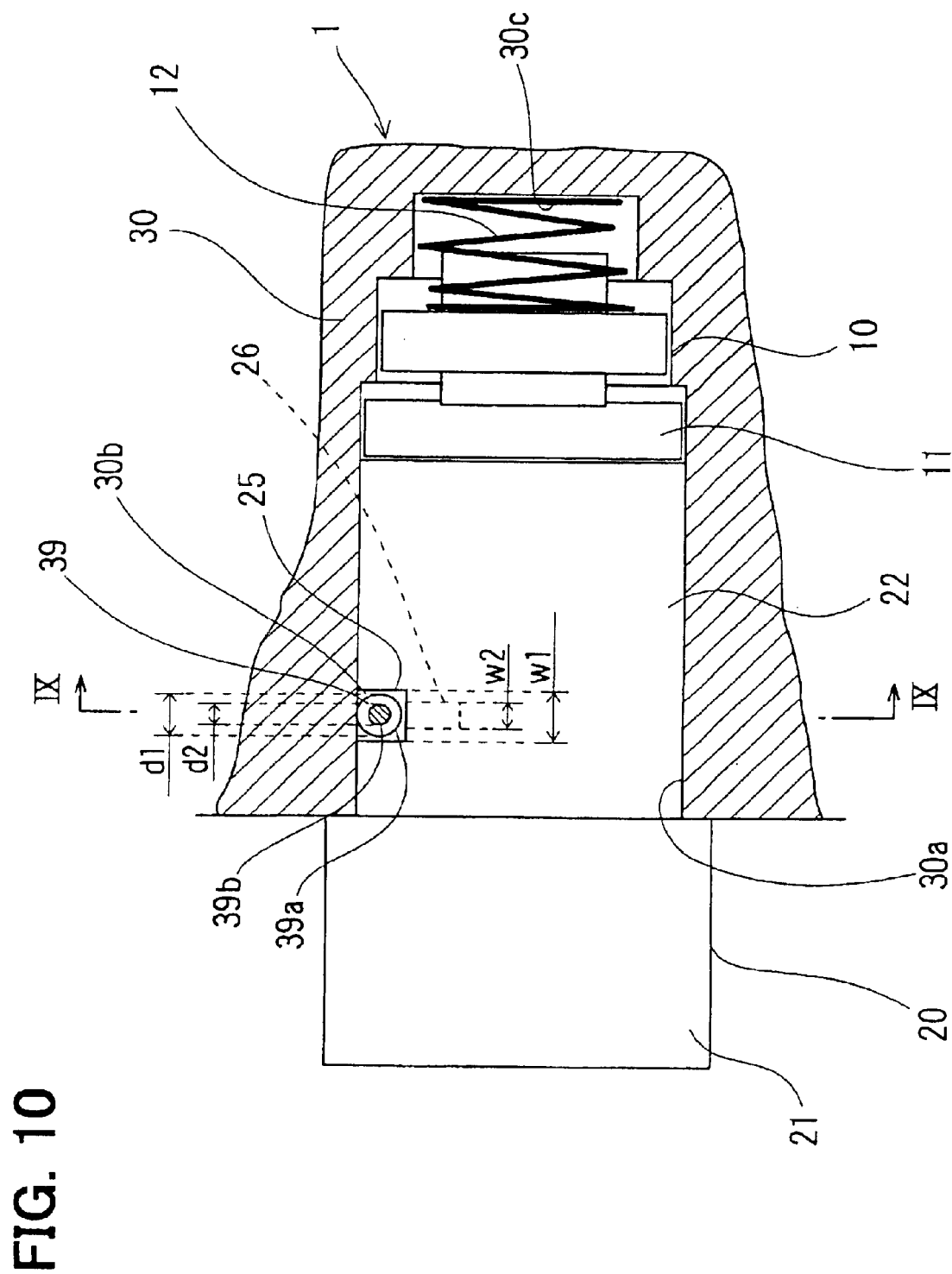
FIG. 10 is a cross-sectional view of a hydraulic module in accordance with the fifth embodiment of the present invention.

As shown in FIG. 9 and FIG. 10, the clutch pressure control valve 10 and the solenoid valve 20 are mounted as hydraulic modules on one valve body 30.

In the aluminum die-cast valve body 30 is formed three-stepped mounting hole 30a. The clutch pressure control valve 10 and the solenoid valve 20 are arranged coaxially with the mounting hole 30a. That is, the clutch pressure control valve 10 and the solenoid valve 20 are mounted side by side in the axial direction in the mounting hole 30a. Further, in the valve body 30 are formed a communication passage (not shown) for flowing the working fluid and an inserting hole 30b into which a pin 39 to be described below is inserted. The inserting hole 30b is formed in the direction perpendicular to the axial direction of the clutch pressure control valve 10 and the solenoid valve 20 such that the inside wall of the inserting hole 30b is in contact with the inside wall of the mounting hole 30a. The material of the valve body 30 may be resin.

The clutch pressure control valve 10 is provided with a spool 11 and a spring 12 and is mounted on the inside bottom portion 30c side of the mounting hole 30a. The spool 11 for allowing or interrupting the communication of the communication passage formed in the valve body 30 has two land portions having different outer diameters. The one end of the spring 12 abuts against the inside bottom portion 30c of the mounting hole 30a and the other end thereof abuts against the end portion of the spool 11. The spring 12 as an urging means urges the spool 11 to the solenoid valve 20 side. The movement of the spool 11 to the solenoid valve 20 side is regulated by the outside wall of the spool 23 to be described later.

The solenoid valve 20 is constituted by a solenoid part 21 as an electromagnetic drive means for driving a valve element 24 according to a switching control signal from the ECU (Electric Control Unit, not shown) and a valve part 22 having the valve element therein and is made into an assembly and mounded on the opening part side of the mounting hole 30a. The valve part 22 has a sleeve 23 that receives the valve element 24 therein and has an opening part (not shown) for flowing the working fluid and slits 25 and 26 in which a pin 50 is inserted and fixed. The slit 25 as the first slit and the slit 26 as the second slit are formed in the outside wall of the sleeve 23 such that they communicate with each other in the circumferential direction. The sleeve 23 is fixed to the valve body 30 by a pin 39. Here, assume that an opening width in the axial direction of the slit 25 is w1 and that an opening width in the axial direction of the slit 26 is w2.

The pin 39 is used for fixing the solenoid valve 20 to the valve body 30 and has a large-diameter part 39a at the center and small-diameter parts 39b at both ends. Here, assuming that the diameter of the large-diameter part 39a is d1 and that the diameter of the small-diameter part 39b is d2, between the opening width w1 in the axial direction of the slit 25 and the opening width w2 in the axial direction of the slit 26 is established the following relationship $w1 > d1$ and $d1 > w2 > d2$ That is, in the slit 25, the opening width w1 in the axial direction is larger than the diameter d1 of the large-diameter part 39a, and besides, in the slit 26, the opening width w2 in the axial direction is smaller than the diameter d1 of the large-diameter part 39a and larger than the diameter d2 of the small-diameter part 39b.

Figure 11:
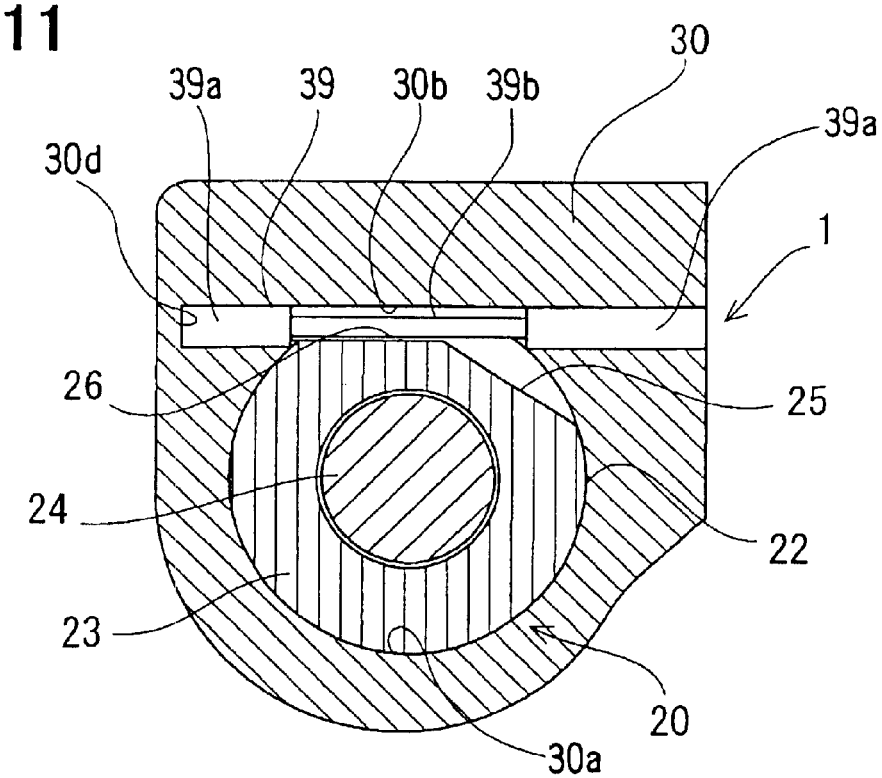
FIG. 11 is a cross-sectional view of a hydraulic module in accordance with the fifth embodiment of the present invention, and shows a cross-sectional view taken along a line IX—IX of FIG. 12.
Figure 12:
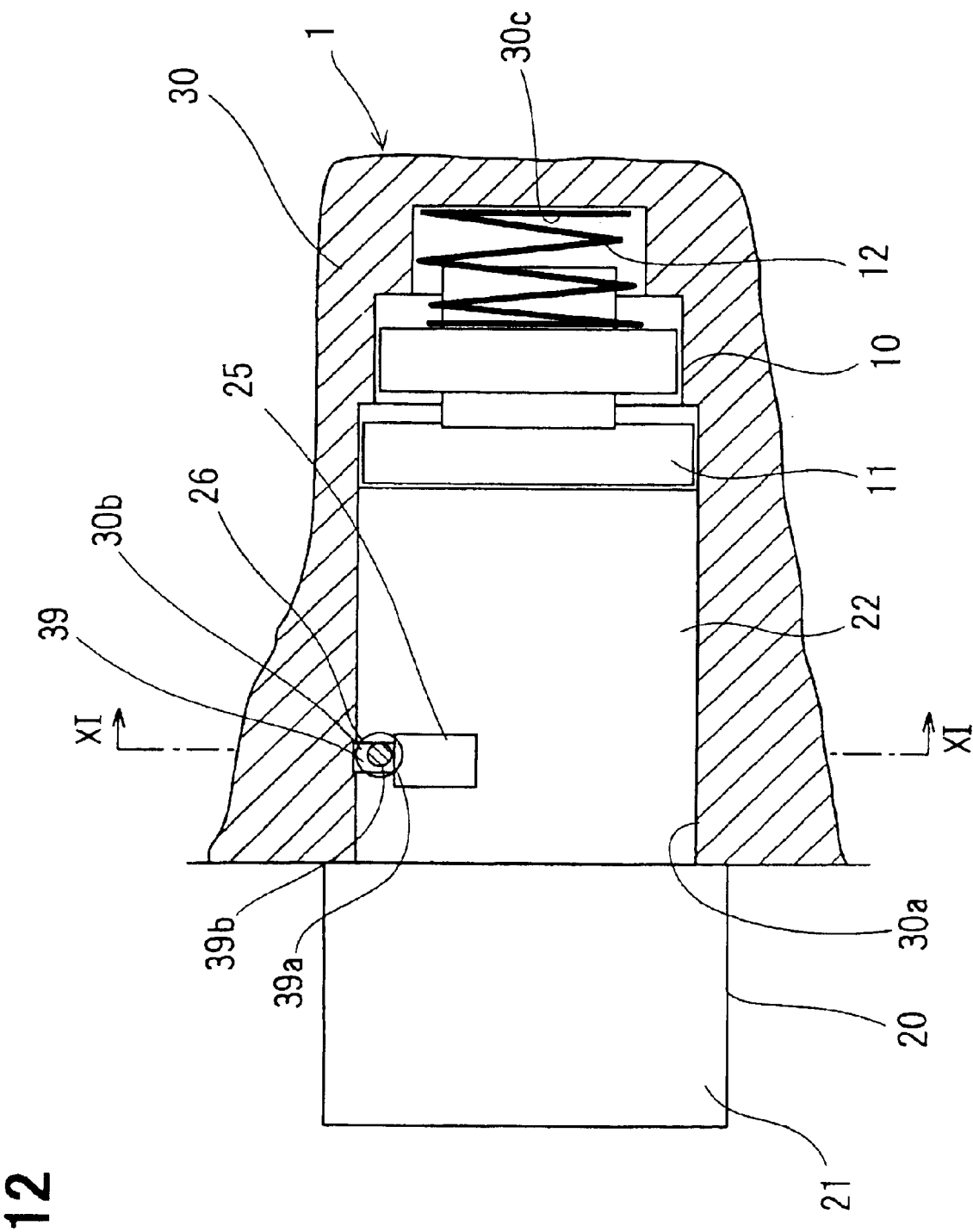
FIG. 12 is a cross-sectional view of a hydraulic module in accordance with the fifth embodiment of the present invention.
Figure 13:
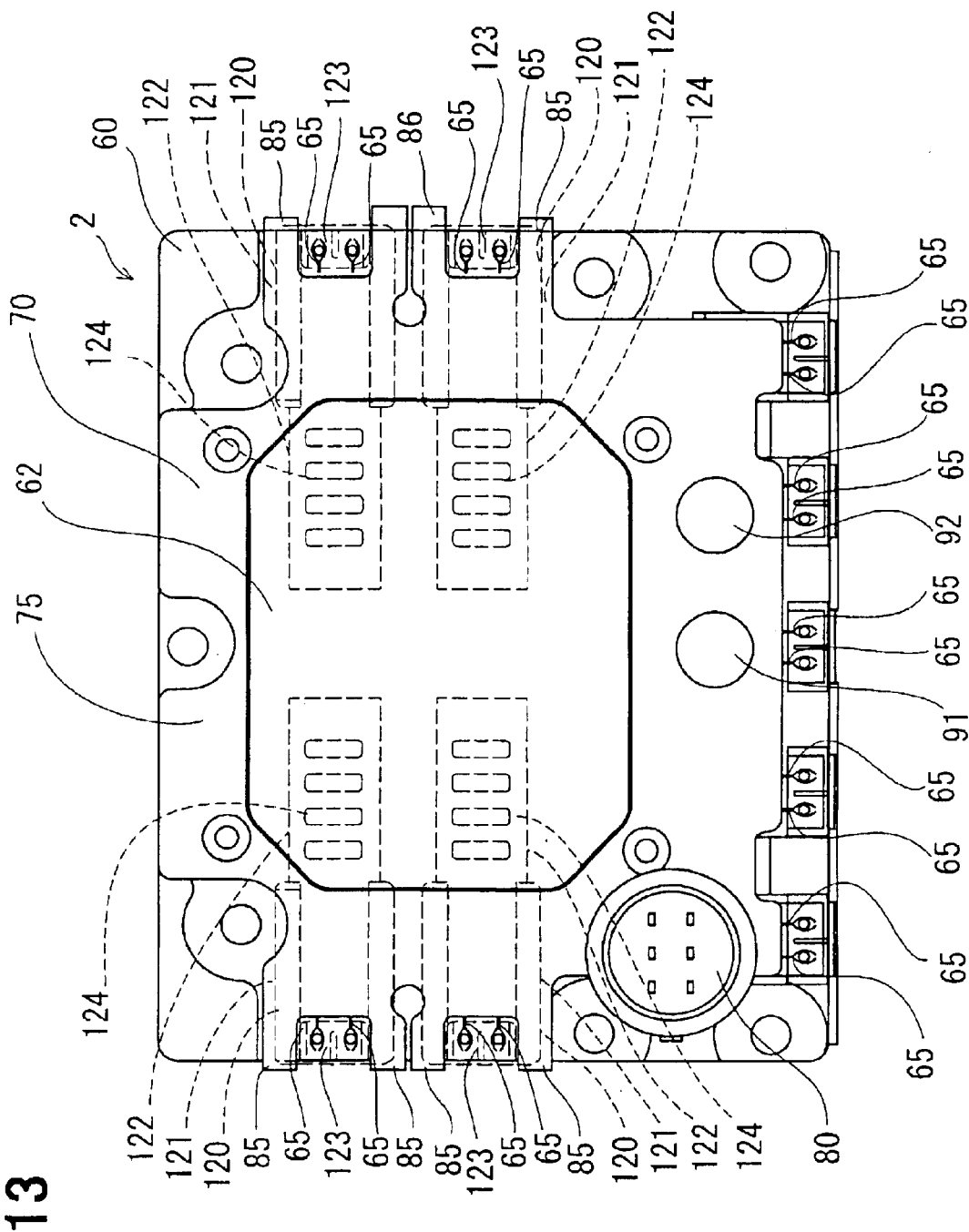
FIG. 13 is a plan view of a hydraulic module in accordance with the sixth embodiment of the present invention.
Figure 14:
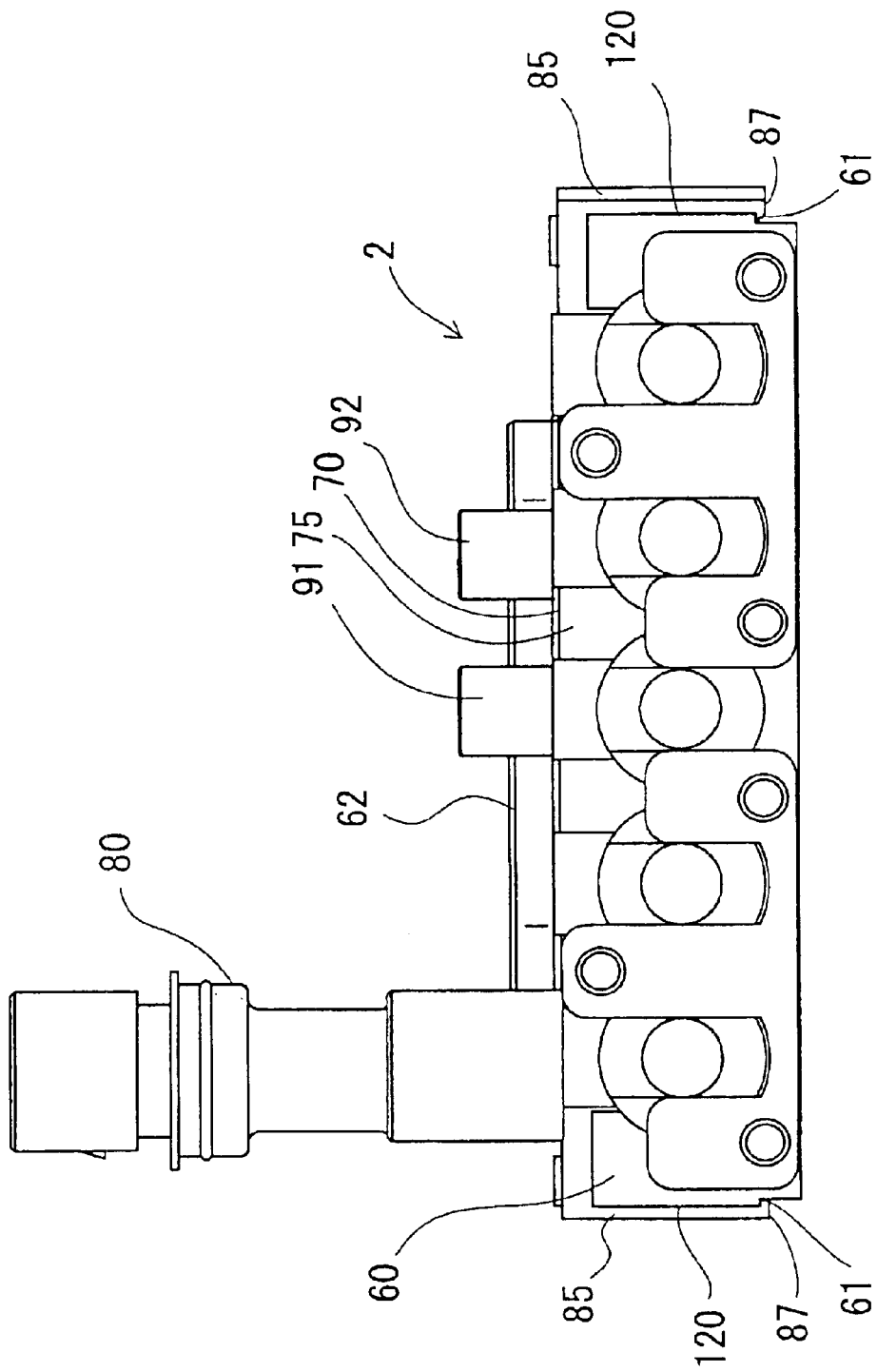
FIG. 14 is a bottom view of a hydraulic module in accordance with the sixth embodiment of the present invention.
Figure 15:
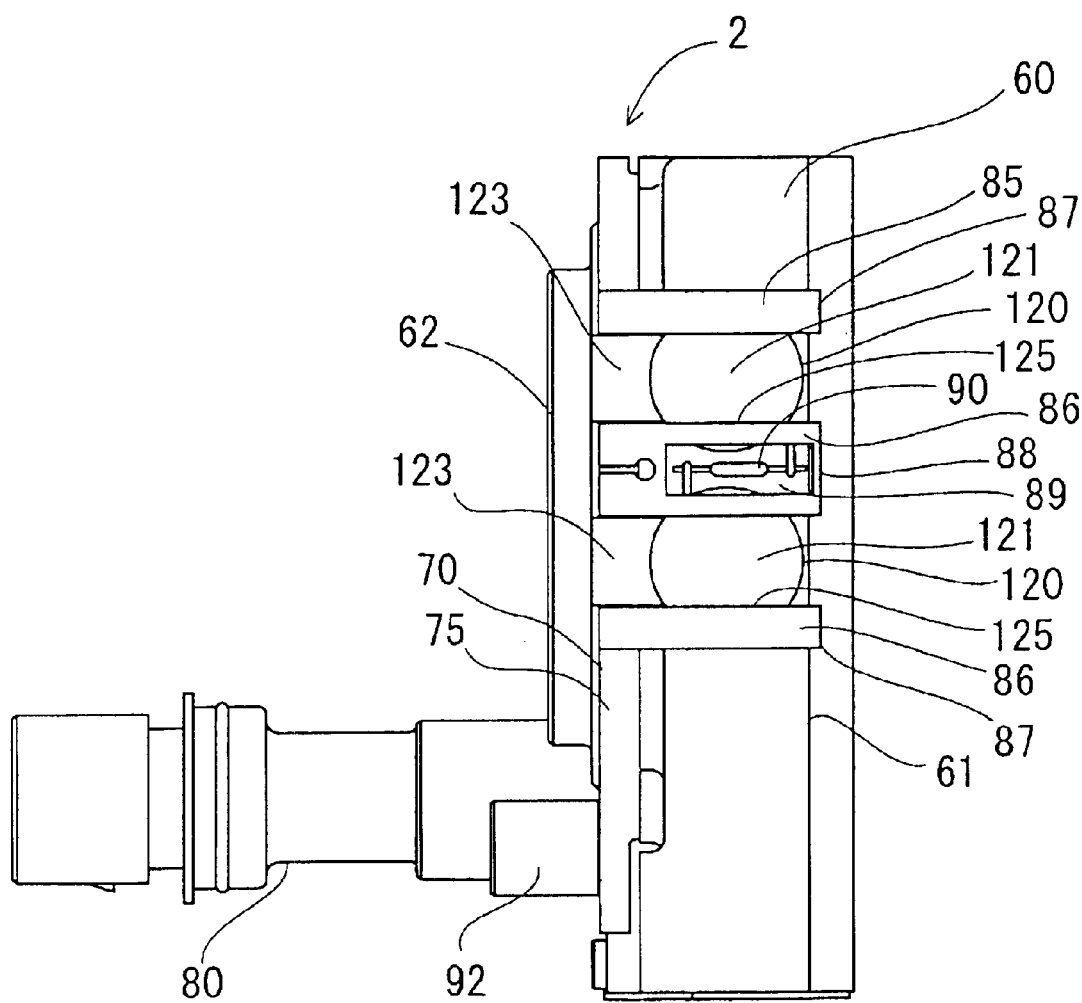
FIG. 15 is a side view of a hydraulic module in accordance with the sixth embodiment of the present invention.
Figure 16:
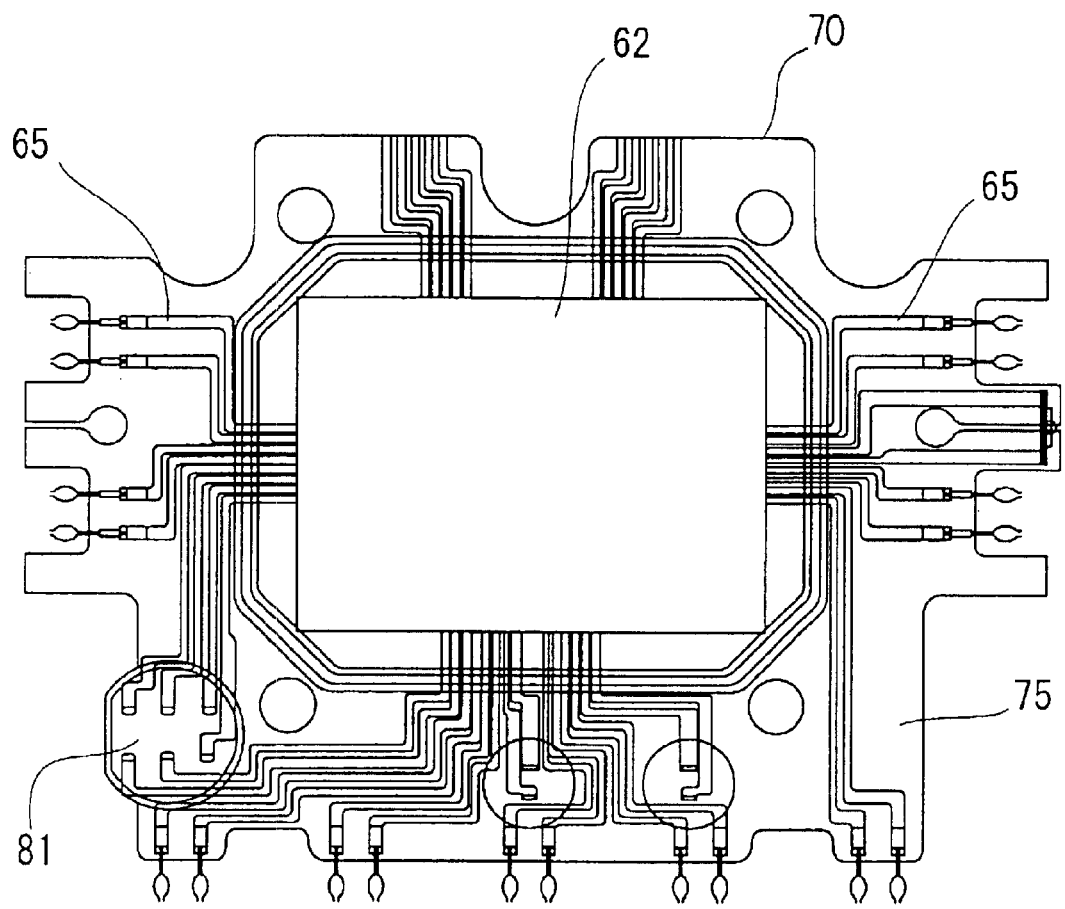
FIG. 16 is a plan view to show an electric circuit component of a hydraulic module in accordance with the sixth embodiment of the present invention.

Next, the procedures for fixing the solenoid valve 20 will be described. The spring 12 is inserted into the mounting hole 30a of the valve body 30 and then the spool 11 is inserted into the mounting hole 30a. Next, the solenoid valve 20 is inserted into the mounting hole 30a. The clutch pressure control valve 10 and the solenoid valve 20 are mounted side by side in the axial direction in the mounting hole 30a and then the slit 25 of the sleeve 23 is arranged coaxially with the inserting hole 30b of the valve body 30 and then the pin 39 is inserted into the inserting hole 30b. Here, when the pin 39 is inserted into the inserting hole 30b, the pin 39 is guided by the inside wall of the inserting hole 30b and the outside wall of the slit 25. When the pin 39 is inserted into the inserting hole 30b to the position where the tip of the large-diameter part 39a abuts against the inside bottom part 30d of the inserting hole 30b, the solenoid valve 20 is turned around its center in the direction of an arrow X, as shown in FIG. 9, then the small-diameter part 39b is opposed to the outside wall of the slit 26. When turning the solenoid valve 20 is stopped, the solenoid valve 20 is pressed onto the opening part side of the mounting hole 30a via the control valve 10 by the urging force of the spring 12. Thus, as shown in FIG. 11 and FIG. 12, the small-diameter part 39b is made to abut against the outside wall of the slit 26 and the solenoid valve 20 is fixed to the valve body 30. Here, in the slit 26, the opening width w2 in the axial direction is smaller than the diameter d1 of the large-diameter part 39a, which therefore prevents the pin 39 from coming off.

Further, in the case where the solenoid valve 20 is inspected and replaced, the solenoid valve 20 can be easily withdrawn from the valve body 30 by turning the solenoid valve 20 about its central axis while pressing the solenoid valve 20 in the direction opposite to the direction in which the urging force of the spring 12 is applied.

The structure of the present embodiment may be combined with the first embodiment to the fourth embodiment.

(Sixth Embodiment)

The sixth embodiment is shown in FIG. 13 to FIG. 16. In the present embodiment, there is provided a hydraulic module 2 in which a solenoid valve 120, an ECU 62, a thermistor 90 and the like are integrated. An aluminum die-cast valve body 60 as a case receives four solenoid valves 120 as actuators for controlling the hydraulic pressure applied to the respective friction elements, and beside, in the valve body 60 is formed a communication passage (not shown) for flowing the working fluid. The material of the valve body 60 may be resin.

The solenoid valve 120 is a linear solenoid valve and is constituted by a solenoid part 121 as an electromagnetic drive means for driving a valve element (not shown) according to a switching control signal from an ECU 62 as a switching control means and a valve part 122 having the valve element described above and is made into an assembly and is mounted in the valve body 60. A connector part 123 that is used for electrically connecting the solenoid part 121 to a bus bar 70 is mounted in a protruding manner on the solenoid part 121. On the outside wall of the end portion of the solenoid part 121 is formed a groove part 125 in which claw parts 85 and 86 to be described later can be fitted. The valve part 122 has an opening part 124 for flowing the working fluid. The ECU 62 for controlling the operation of the solenoid valve 120 is mounted on the bus bar 70. In the bus-bar 70, a terminal 65 for electrically connecting the ECU 62 to the solenoid valve 120 is inserted into a resin part 75. Further, the bus bar 70 is provided with a connector part 81 of an integrated connector 80 to be electrically connected to an ECU for controlling the engine (not shown), the ground and the like, the claw parts 85 and 86, a thermistor 90, a level sensor 91, and a degradation sensor 92. The ECU 62 and the bus bar 70 are mounted in laminated manner on the body having an actuator 120.

The claw parts 85 and 86 as connection means join the bus bar 70 to the valve body 60 by means of a snap fit to fix the solenoid valve 120 to the valve body 60. Tips 87 and 88 of the claw parts 85 and 86 are caught on the stepped portion 61 of the valve body 60 to join the bus bar 70 to the valve body 60 and to prevent the solenoid valve 120 from moving in the axial direction. Here, preferably, the number of claw parts is not less than two for one solenoid valve, from the viewpoint of fixing the solenoid valve 120, but in the case where the plurality of solenoid valves 120 are adjacent to each other, as shown by the claw part 86, two solenoid valves 120 may be fixed by one claw part. Further, fitting the claw parts 85 and 86 in the groove part 125 formed in the solenoid part 121 prevents the solenoid valve 120 from moving in the rotational direction. Still further, in the claw part 86 is formed an opening window 89 in which the thermistor 90 is built. The thermistor 90 constitutes a temperature detecting part for detecting the temperature of the working fluid. Building the thermistor in the claw part 86 makes it possible to dip the thermistor in the working fluid, thereby makes the thermistor 90 hard be exposed to the atmosphere.

Joining the bus bar 70 to the valve body 60 and fixing the solenoid valve 120 to the valve body 60 by the snap fit eliminates the need for providing members such as a pin, a bracket, a bolt and the like and thus makes it possible to reduce the number of components and to fix the solenoid valve 120 to the valve body 60 by a simple constitution. Further, the use of the snap fit of the claw parts 85 and 86 in assembling the components facilitates the assembling work easy and reduces assembling man-hours, thereby reducing manufacturing costs.

In the rear end surface of the solenoid part 121 is formed a groove part 125 parallel to a diameter passing the connector part 123. The claw parts 85 and 86 are fitted in the groove part 125. As a result, this prevents the rotation of the solenoid valve 120. The connector part 123 is positioned between the claw part 85 and the claw part 86. The gap between the claw part 85 and the claw part 86 is nearly equal to the width of the connector part 123. As a result, the connector part also prevents the rotation of the solenoid valve 120. It is also recommended that the connector part 123 be received in a groove directly formed in the valve body 60. In this case, the rotation of the solenoid valve 120 can be surely prevented by the valve body.

It is also recommended that the filtering means 37 and 137 in the first to fourth embodiments be used for the valve body 60 in the present embodiment.

(Seventh Embodiment)

Figure 17:
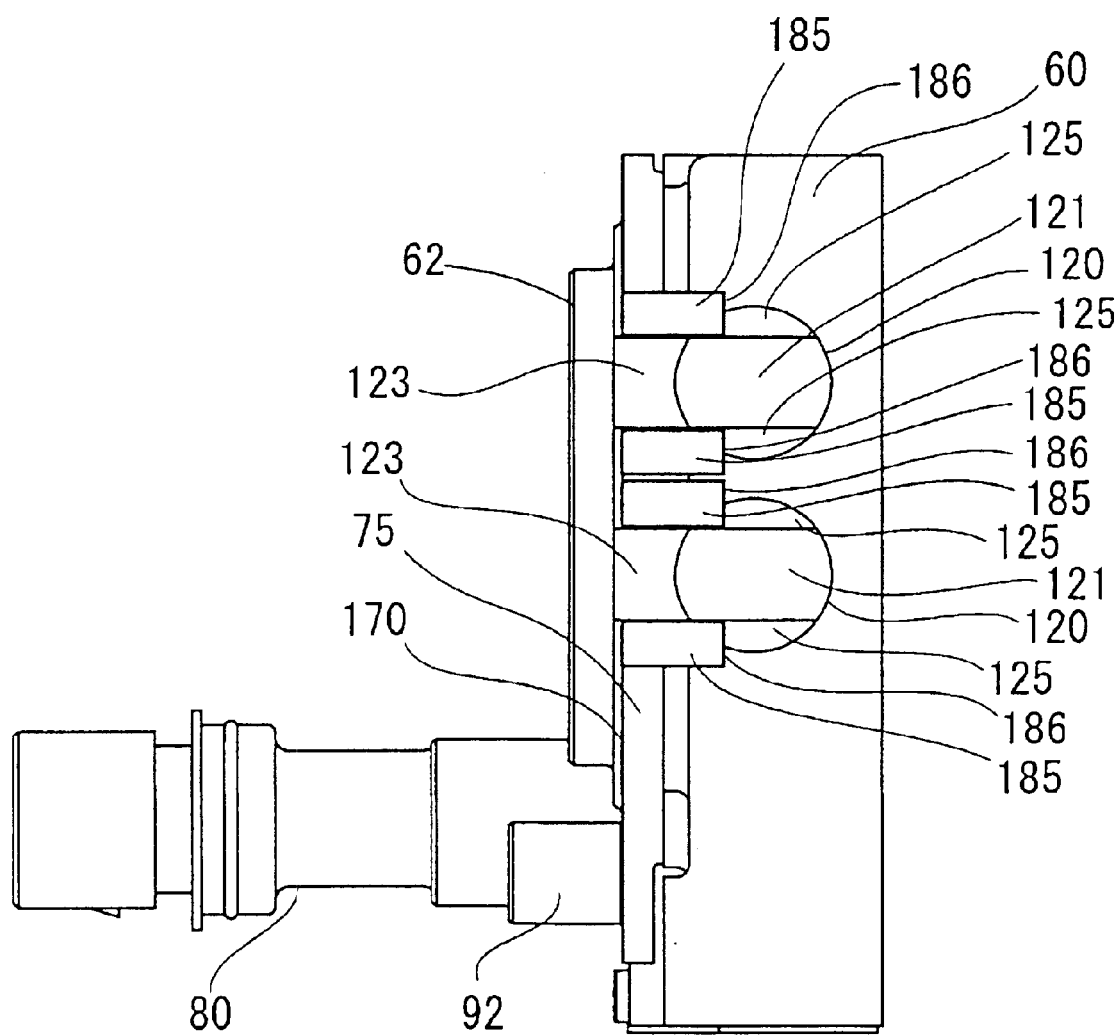
FIG. 17 is a side view of a hydraulic module in accordance with the seventh embodiment of the present invention.

The seventh embodiment will be shown in FIG. 17. A bus bar 170 as a joining member is mounted with the ECU 62 and is joined to the valve body 60 by bolts or the like (not shown) and is provided with a claw part 185. The claw part 185 as a joining means fixes the solenoid valve 120 to the valve body 60 by the snap fit and the end portion 186 of the claw part 185 is fitted in the groove part 125 formed in the solenoid part 121 to prevent the solenoid valve 120 from moving in the axial direction and in the rotational direction.

In the seventh embodiment, the solenoid valve 120 can be easily removed from the valve body 60 without removing the bus bar 170 from the valve body 60. Therefore, this eliminates the need for disassembling the case, and facilitates the maintenance work and thus improves maintainability.

(Eighth Embodiment)

Figure 18:
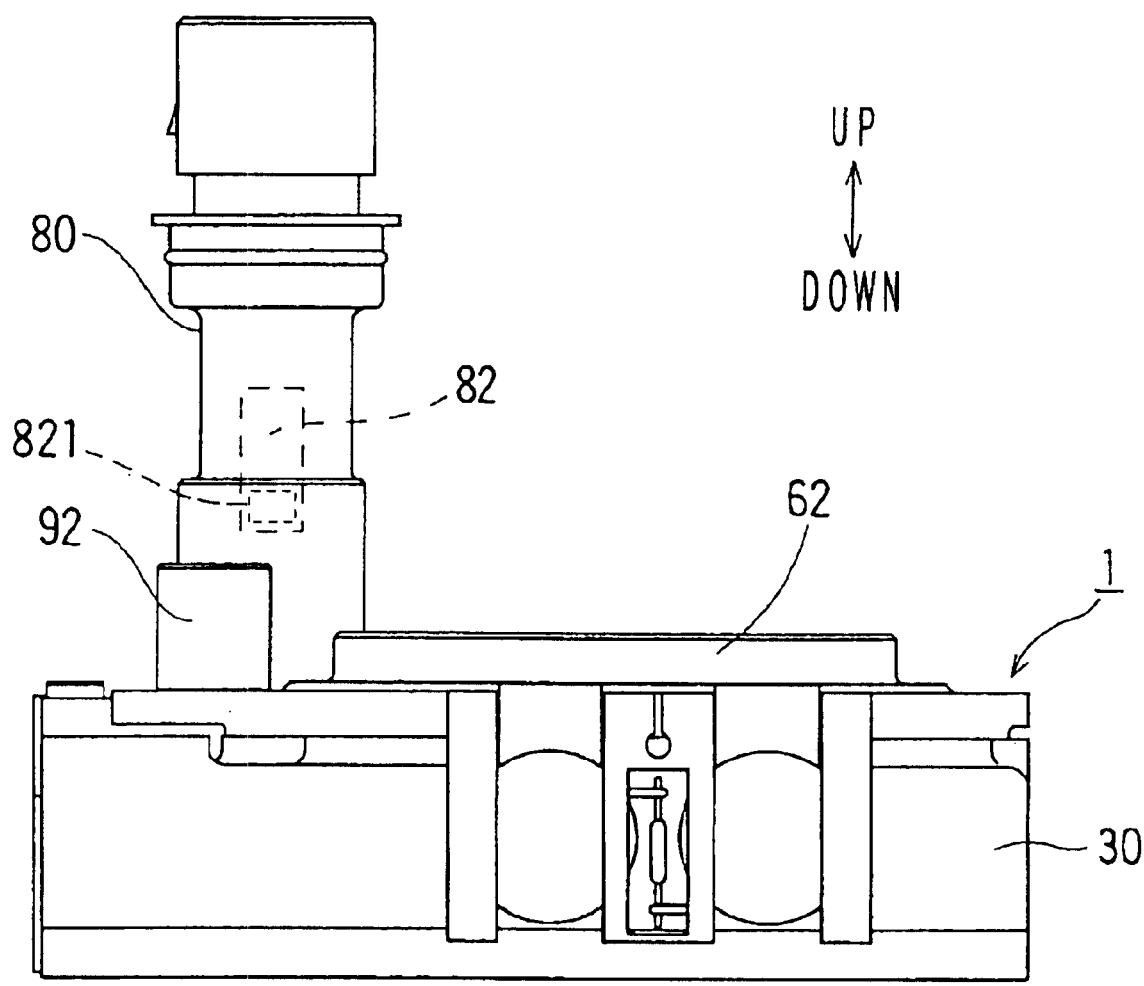
FIG. 18 is a side view of a hydraulic module in accordance with the eighth embodiment of the present invention.

FIG. 18 shows the eighth embodiment. An integrated connector 80 is a connector that is electrically connected to the ECU 62 via the connector part 81 to take out the control signal of the ECU 62 and is electrically connected to the ECU for controlling the engine (not shown), the ground and the like. The integrated connector 80 is provided with a level sensor 82 as a level detecting means for detecting the amount of oil. It is judged whether or not the detection value detected by the level sensor 82 is within a predetermined range and if the detection value is out of the predetermined range, it is judged that the amount of oil is abnormal and the abnormality of the amount of oil is indicated on an indicator as an indication means (not shown).

The level sensor 82 has a float member 821 mounted on the integrated connector 80. The float member 821 is formed of a material having a density smaller than the working fluid and can float on the liquid level of the working fluid. For this reason, the float member 821 follows the liquid level of the working fluid and moves in the vertical direction, shown in FIG. 18, in the integrated connector 80. The float member 821 has a signal outputting part (not shown) for outputting an electric signal when the float member 821 moves nearer to the valve body 30 side than a predetermined position. In this manner, when the liquid level of the working fluid is lower than a predetermined level as the amount of working fluid decreases, the float member 821 outputs a signal indicating the abnormal amount of working fluid to the ECU 62. Therefore, it is possible to surely detect the abnormal amount of working fluid by a simple structure.

Incidentally, the level sensor 82 is not limited to the detection of the liquid level of the working fluid by the use of the float member 821 but, for example, a change in an electrostatic capacity or a change in the resistance of a resistor can be utilized as the level sensor 82. The level sensor 82 in the present embodiment can be combined with the other embodiments.

(Ninth Embodiment)

FIG. 19 to FIG. 27 show the ninth embodiment. Here, FIG. 19 to FIG. 22 show the state schematically in which the bus bar 70 shown in FIG. 9 is removed from the hydraulic module 1. In this embodiment, the solenoid valve 20, the ECU 62, the level sensor, and the thermistor are integrated into a hydraulic module 3. An aluminum plate 64 to which the substrate 63 of the ECU 62 is bonded is connected to a valve body 300 via a partition wall 350 as a connection member.

Figure 19:
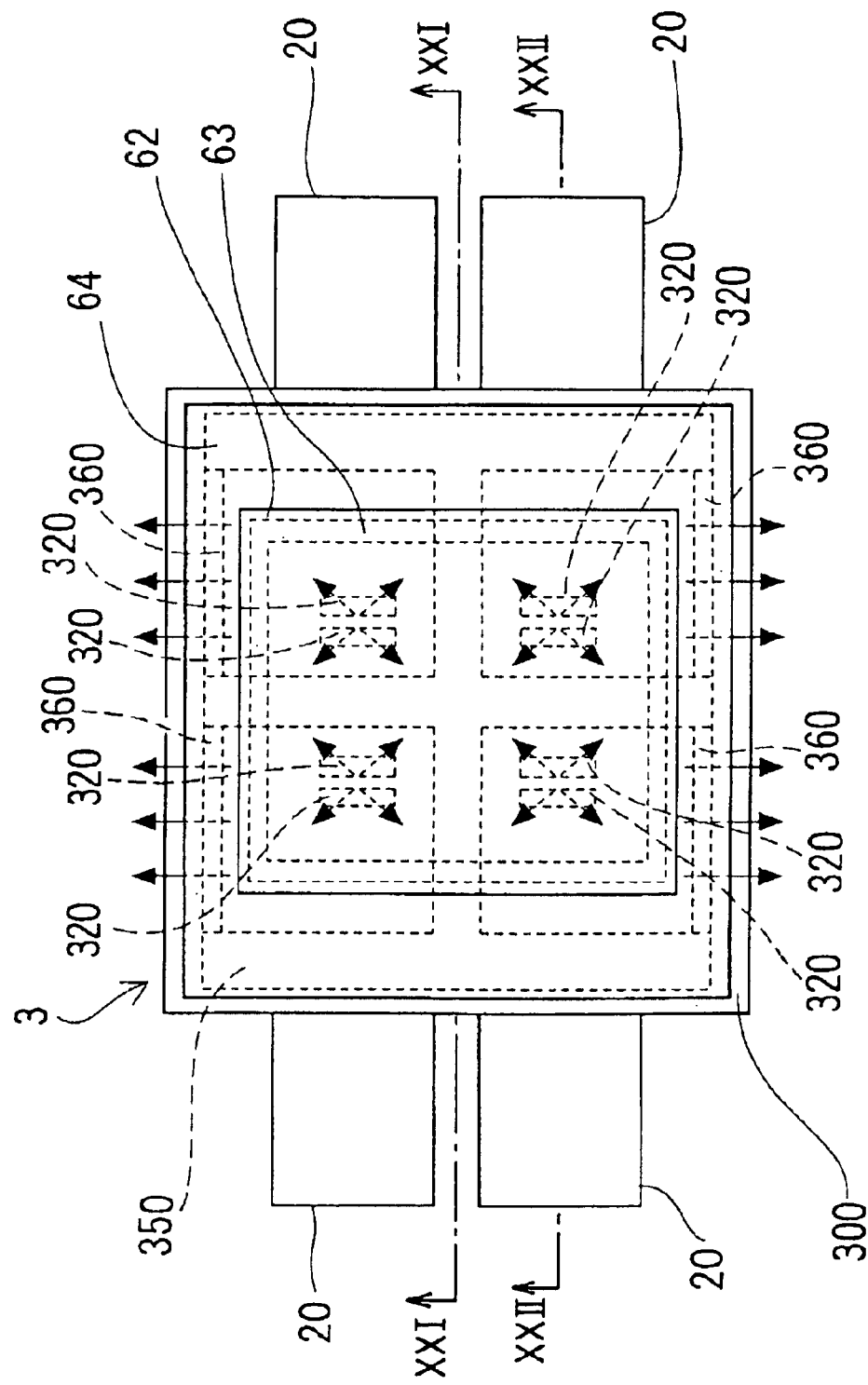
FIG. 19 is a plan view of a hydraulic module in accordance with the ninth embodiment of the present invention, in which the respective parts are schematically depicted to show the positional relationship between an ECU and a valve body.
Figure 20:
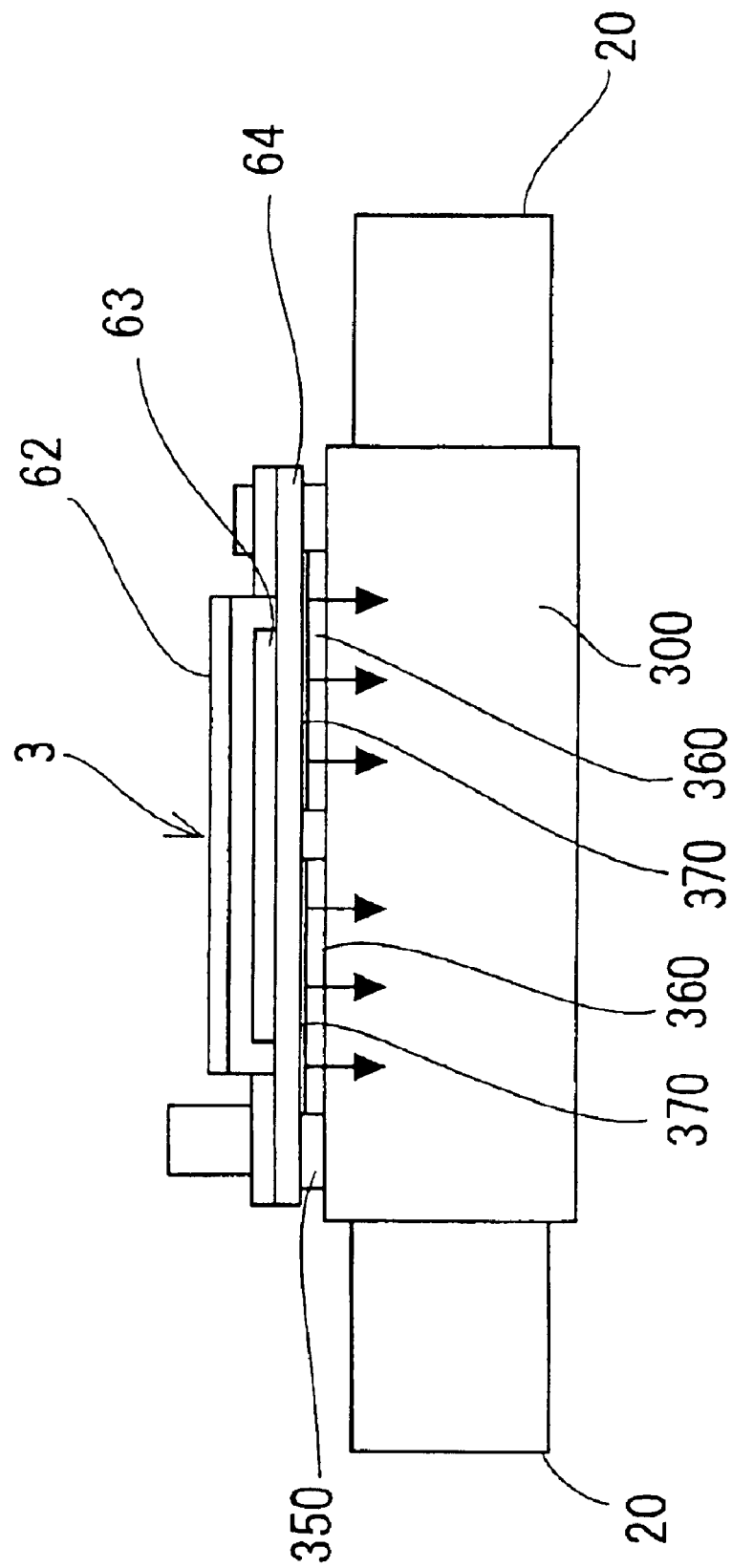
FIG. 20 is a bottom view of a hydraulic module in accordance with the ninth embodiment of the present invention.
Figure 21:
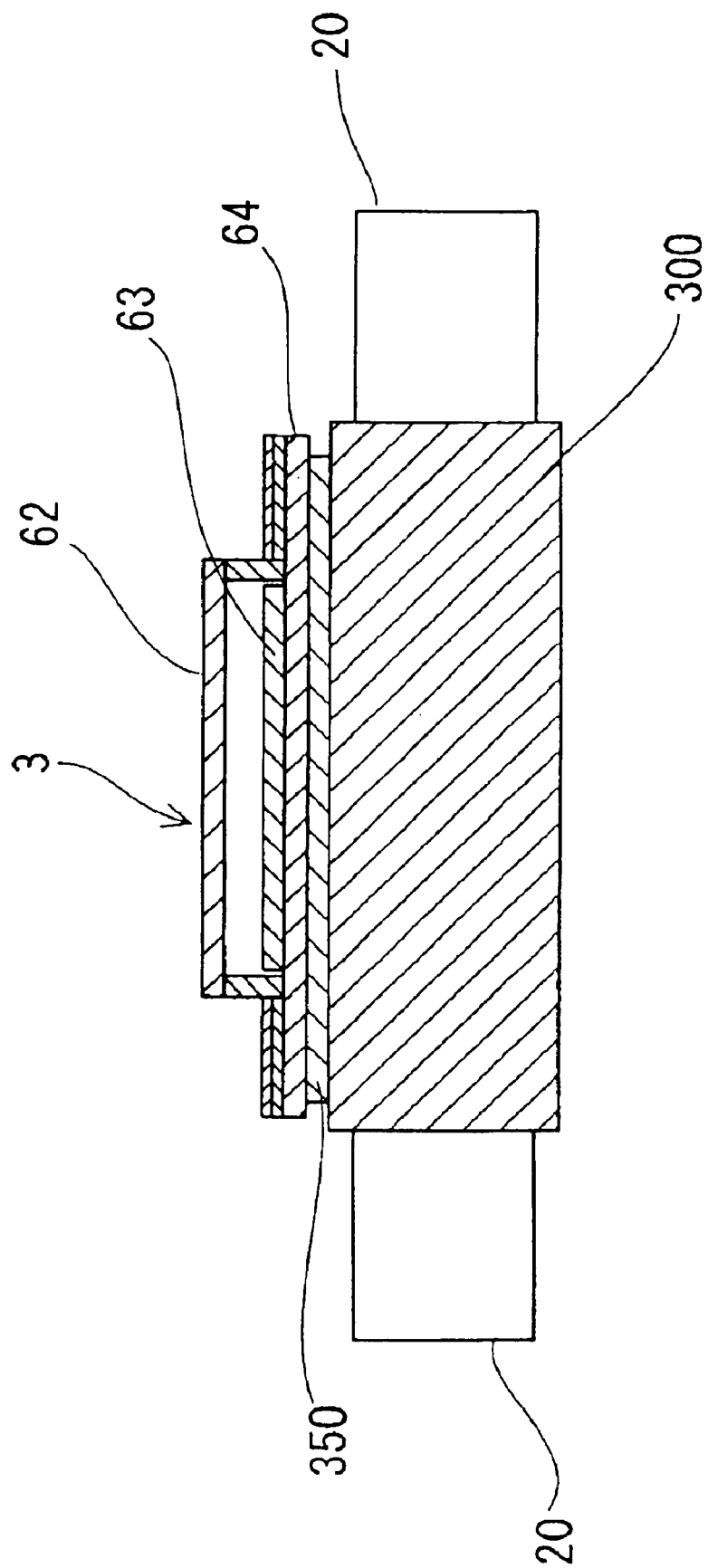
FIG. 21 is a cross-sectional view of a hydraulic module in accordance with the ninth embodiment of the present invention, and shows a cross-sectional view taken along a line XXI—XXI of FIG. 19.
Figure 22:
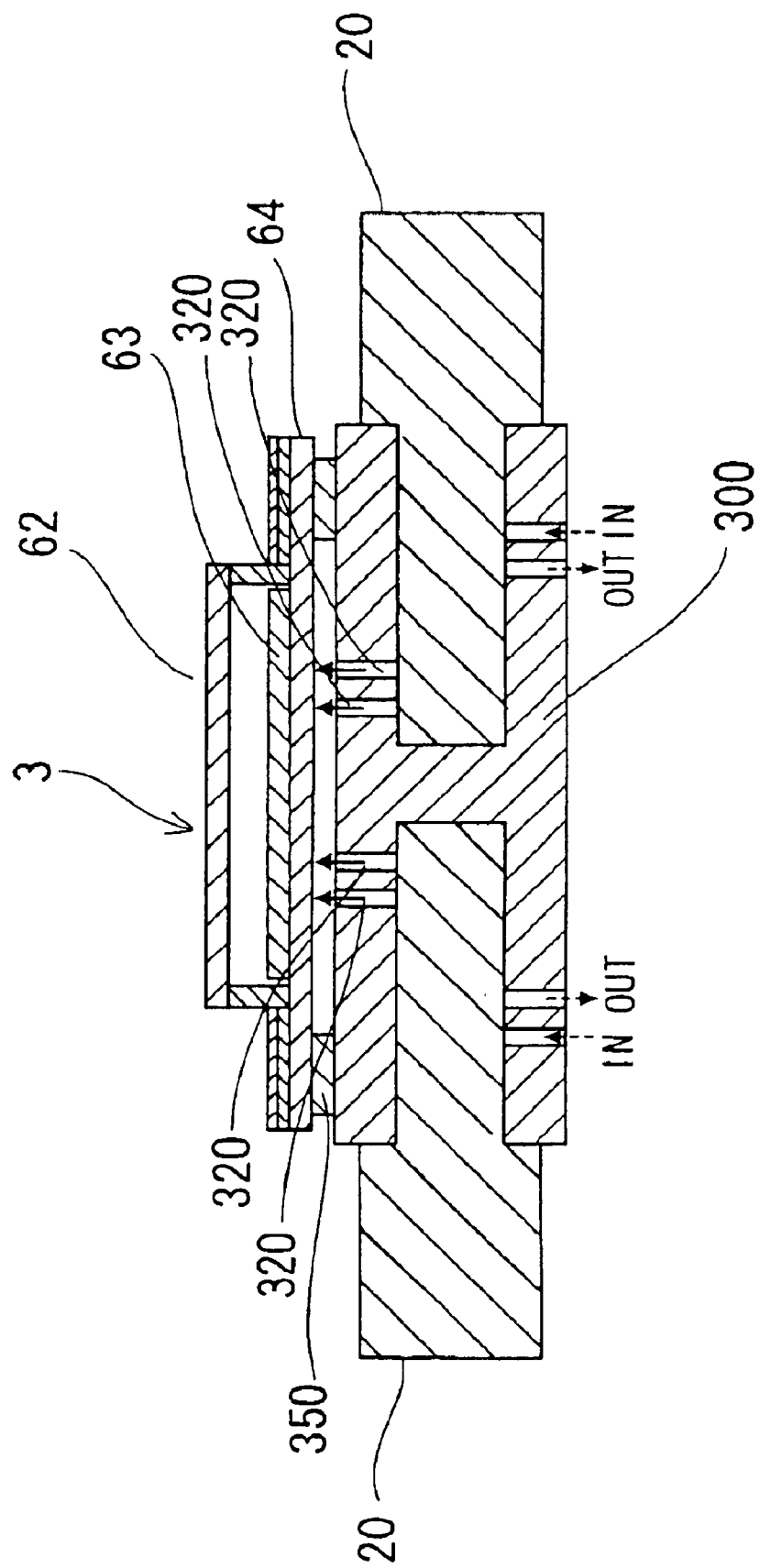
FIG. 22 is a cross-sectional view of a hydraulic module in accordance with the ninth embodiment of the present invention, and shows a cross-sectional view taken along a line XXII—XXII of FIG. 19.

The hydraulic module 1 has four solenoid valves 20. As shown in FIG. 19, the partition wall 350 is in close contact with the plate 64 such that it divides the bottom of the plate 64 into four sections for the respective solenoid valves 20. A plurality of drain ports 320 formed in the valve body 300 communicates with the opening parts 124 of the valve part 122 shown in FIG. 13. The drain ports 320 open opposite to the plate 64. Here, the drain ports 320 constitute fluid splashing means for splashing the working fluid discharged from the solenoid valve 20 to the plate 64. Further, at the end of the gap between the plate 64 and the valve body 300 is provided a partition wall 360 for storing the working fluid splashed to the plate 64 from the drain ports 320. The working fluid stored by the partition walls 350 and 360 can be attached to the plate 64 by the running conditions of a vehicle and the vibrations of the vehicle. Between the plate 64 and the partition wall 360 is provided a gap 370 and when the level of the working fluid stored by the partition walls 350 and 360 becomes higher than the height of the partition wall 360, the working fluid flows into the oil pan 41 from the gap 370. Here, it is desirable that the shape and height of the partition wall 360 as fluid storing means be appropriately changed according to a layout in which the hydraulic module is mounted. Here, the arrows shown in FIG. 19 and FIG. 20 show the flow of the working fluid discharged from the solenoid valve 20.

Figure 23:
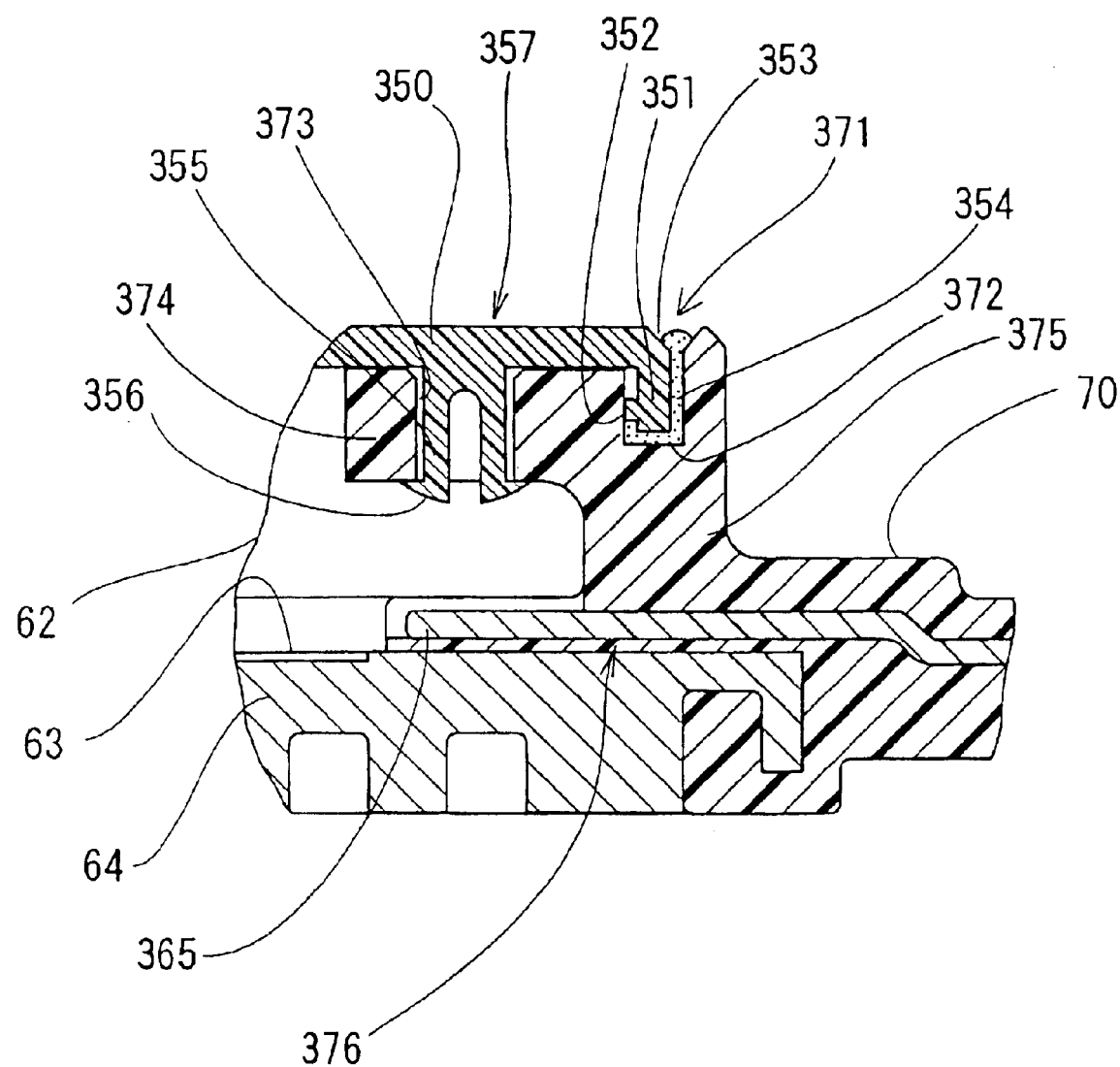
FIG. 23 is an enlarged cross-sectional view to show the connection part of the ECU and the bus bar of a hydraulic module in accordance with the ninth embodiment of the present invention.

FIG. 23 is an enlarged cross-sectional view of the connection part of the bus bar 70 and the ECU 62. The bus bar 70 has a resin member 375 in which the plate 64 is inserted. Further, in the resin member 375 are inserted a plurality of terminals 365. In the resin member 375 is formed a container for mounting the ECU 62 therein. In the container is arranged the substrate 63 of the ECU 62. The opening part of the container is covered with a covering member 350 as a sealing member. The gap between the covering member 350 and the resin member 375 is sealed. The covering member 350 is made of resin. A fitting part 371 between the resin member 375 and the covering member 350 is constituted by a groove 372 formed in the resin member 375 and a wall 351 formed on the covering member 350. The groove 372 is rectangular in a cross section and is formed on the whole peripheral portion of the container. The wall 351 is formed on the whole peripheral portion of the covering member 350. The wall 351 is thinner than the width of the groove 372. A protrusion 352 is formed in a protruding manner on the whole inside peripheral portion of the wall 351. The tip of the protrusion 352 is in close contact with the inside surface of the groove 372, whereas a comparatively narrow gap 354 is formed between the outside surface of the wall 351 and outside surface of the groove 372 and between the tip of the wall 351 and the bottom of the groove 372. The outside corner of the covering member 350 is chamfered. The corner of the resin member 375 regulating the outside of the groove 372 is chamfered. An enlarged gap 353 is formed by chamfering the corners.

When the parts are assembled, an adhesive is previously fitted in the groove 372. The wall 351 is inserted into the groove 372. The protrusion 352 is put into contact with the wall surface of the groove 372 while the wall 351 is being inserted. The adhesive fills the gap 354, overflows to the enlarged gap 353, and accumulates there. Thus, the adhesive does not flow into the container.

Inside the fitting part 371 is formed an auxiliary engaging part 357. The engaging part 357 connects the covering member 350 to the resin member 375 by mechanical means. The engaging part 357 relaxes a stress applied to the fitting part 371. In the present embodiment, the engaging parts 357 are provided at four points in accordance with the corners of the container.

The engaging part 357 is constituted by a snap fit mechanism. The resin member 375 has a wall 374 extending to the inside from the fitting part 371. In the wall 374 is vertically formed a through hole 373. The covering member 350 has an engaging protrusion 355 in accordance with the hole 373. The engaging protrusion 355 has a groove such that it can be elastically deformed. At the tip of the engaging protrusion 355 is provided a claw 356. The engaging protrusion 355 is inserted into the hole 373. When the claw 356 reaches the bottom of the wall 374, it is expanded and caught there. The engaging protrusion 355 is fixed to the hole 373 by the snap fit. The engaging protrusion 355 mechanically regulates the movement of the covering member 350 with respect to the vertical direction in the drawing and also to the horizontal direction in the drawing.

Figures 24, 25:
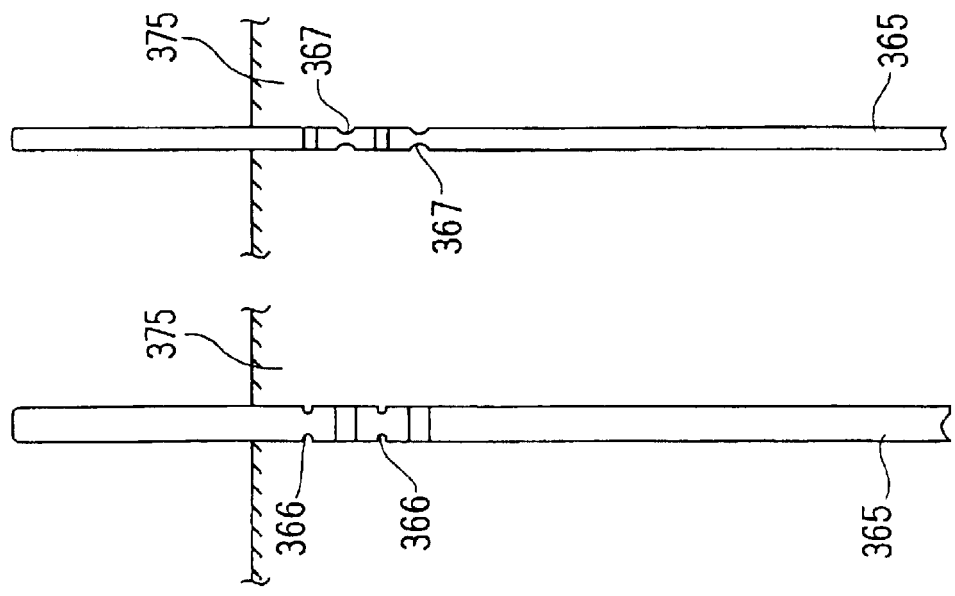
FIG. 24 is a plan view to show a terminal in accordance with the ninth embodiment of the present invention.
FIG. 25 is a plan view to show a terminal in accordance with the ninth embodiment of the present invention.

Further, on the inserting part 376 of a terminal 365 is provided a labyrinth structure for improving sealing performance of the inserting part 376. The labyrinth structure, as shown in FIG. 24 or FIG. 25, is formed by a plurality of notches 366 and 367 made in the direction of width of a plate-shaped terminal 365 and in the direction of thickness thereof. Here, from the viewpoint of ensuring the strength of the terminal 365, it is desirable that the sizes of the notches 366 and 367 be not larger than one third of the width and thickness of the terminal 365. Forming the plurality of notches 366 and 367 described above makes it possible to enlarge the length of a passage through which the working fluid enters the ECU 62 and further to keep the close contact between the terminal 365 and the resin part 375 eve if a stress is produced by the difference in the coefficient of thermal expansion between the terminal 365 and the resin part 375. Here, the shape of the terminal 365 is not limited to a plate.

Figures 26, 27:
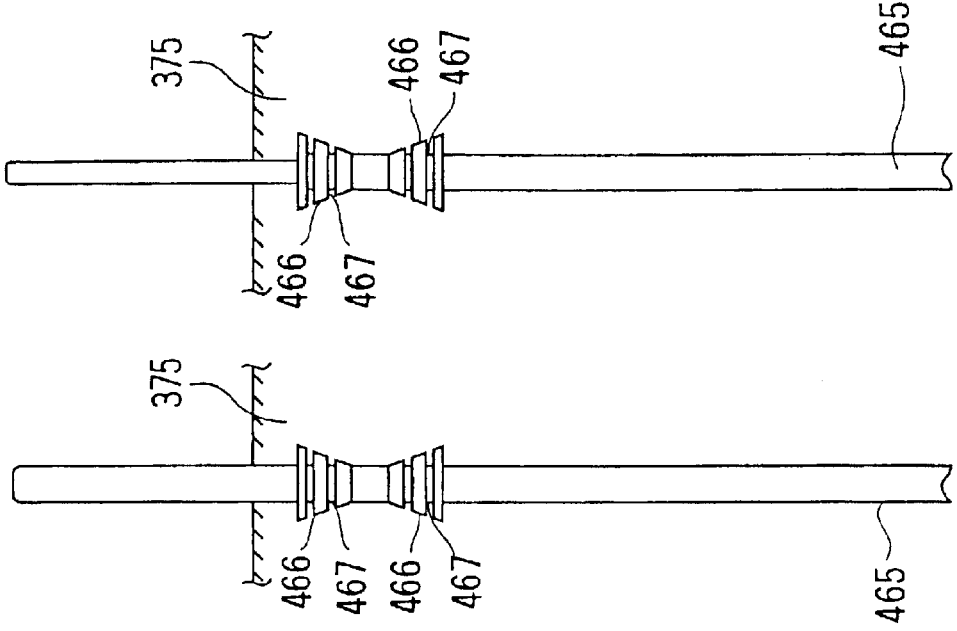
FIG. 26 is a plan view to show a terminal in accordance with the ninth embodiment of the present invention.
FIG. 27 is a plan view to show a terminal in accordance with the ninth embodiment of the present invention.

It is also recommended that the labyrinth structure shown in FIG. 26 and FIG. 27 be adopted. The labyrinth structure is formed by forming a plurality of protrusions 466, each of which is formed in the shape of a cone, on a terminal 465 shaped like a circular bar, and by forming a plurality of annular grooves 467 on the respective protrusions 466. From the viewpoint of ensuring the strength of the terminal 465, it is preferable that the diameter of the annular groove 467 be equal to or larger than the diameter of the circular bar. Here, the ECU connection side of the terminal is shaped like a plate.

In the ninth embodiment of the present invention described above, the ECU 62 is laminated on the solenoid 20, so that the hydraulic module 3 can be reduced in size. Thus, they can be easily mounted in a limited space in the oil pan 41, thereby producing an effect of facilitating the assembling work and the maintenance work thereof.

Further, in the ninth embodiment, the fitting part 371 is provided and the labyrinth structure is provided at the inserting part of the terminal 65, so that it is possible to prevent the intrusion of the working fluid and to ensure hermetic property. This can ensure reliability by a simple constitution and reduce the number of components. Further, since the engaging part 357 is provided, it relaxes the stress of the fitting part 371 and surely prevents the working fluid from entering from the fitting part 371, even if the part mounted with the substrate is expanded or contracted by the atmospheric temperature. In this manner, the ninth embodiment facilitates the assembling work and reduces the assembling man-hours, and therefore can reduce manufacturing costs.

In the ninth embodiment, the heat produced in the ECU 62 is taken by the working fluid. Thus, the ECU 62 can be effectively cooled without using a cooling fan or the like. This can ensure reliability by a simple constitution and reduce the number of components.

(Tenth Embodiment)

The tenth embodiment will be shown in FIG. 28 and FIG. 29. A hydraulic module 4 is provided with the clutch pressure control valve 10. The clutch pressure control valve 10 constitutes a control valve. An aluminum die-cast valve body 530 as a case receives an actuator for controlling hydraulic pressure applied to the respective friction elements, four solenoid valves 20 as control valves, and the clutch pressure control valve 10. A plurality of drain ports 532 formed in the valve body 530 constitute fluid splashing means for splashing the working fluid discharged from the solenoid valve 20 and the clutch pressure control valve 10 to the plate 64.

In addition, in the tenth embodiment, the working fluid discharged from the solenoid valve 20 and the clutch pressure control valve 10 is splashed to the plate 64 by the drain ports 532. Thus, this can improve the cooling performance of the ECU 62.

(Eleventh Embodiment)

Figure 30:
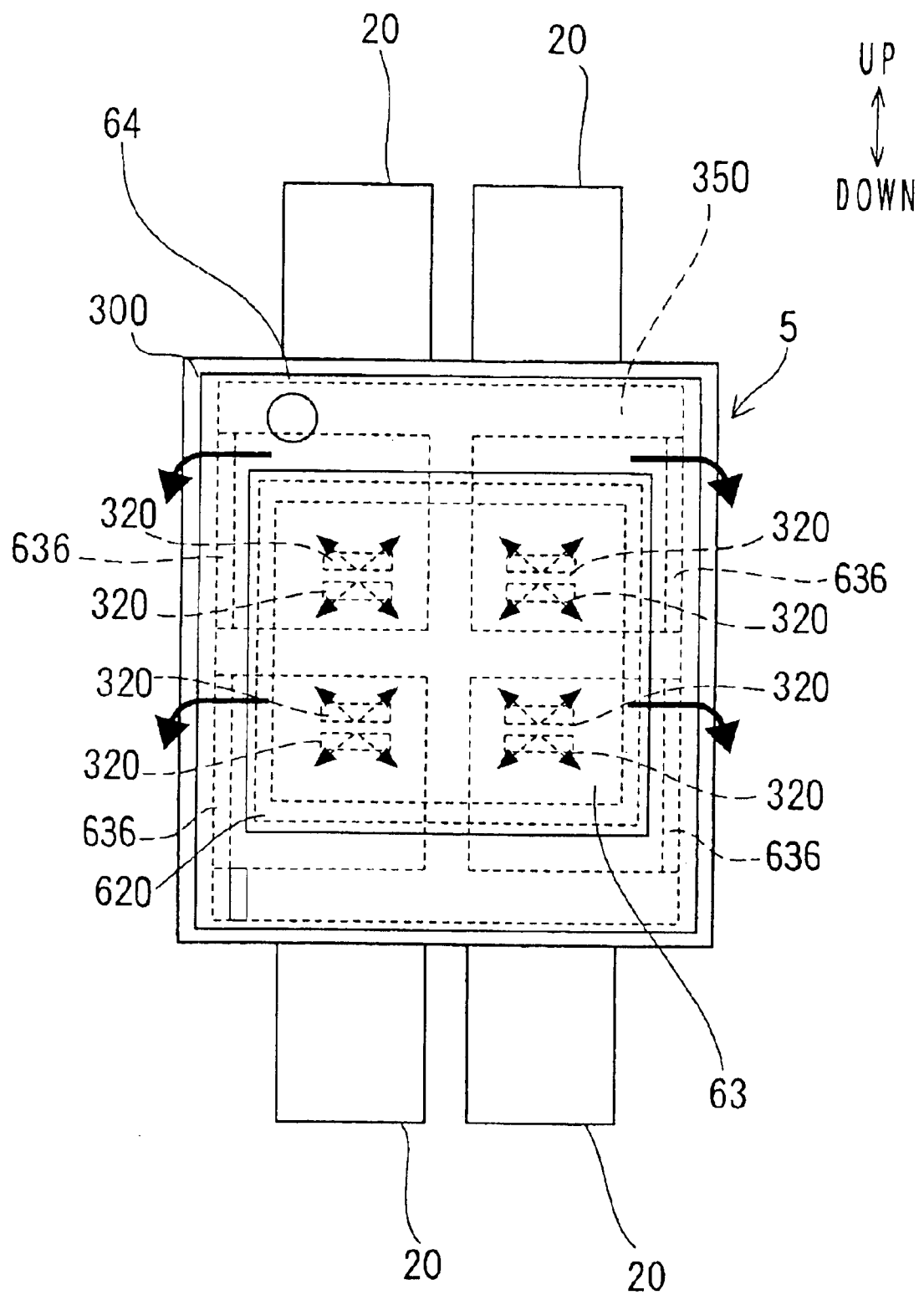
FIG. 30 is a plan view of a hydraulic module in accordance with the eleventh embodiment of the present invention.
Figure 31:
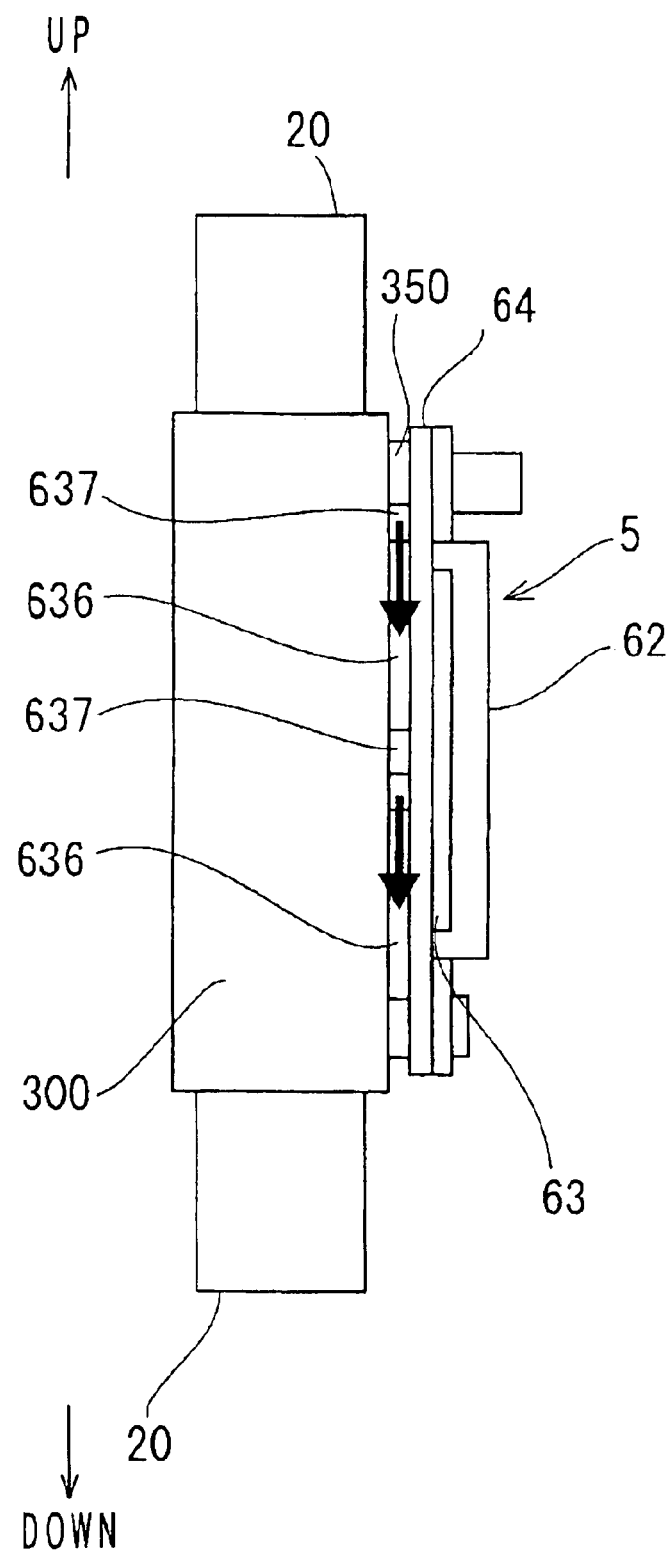
FIG. 31 is a side view of a hydraulic module in accordance with the eleventh embodiment of the present invention.

The eleventh embodiment will be shown in FIG. 30 and in FIG. 31. As shown in FIG. 30 and FIG. 31, in a hydraulic module 5, the solenoid 20 is arranged such that its axial direction is the up and down direction, that is, in the vertical direction. For this reason, it is possible to splash or attach a large amount of working fluid to the plate 64 by the use of gravity. Thus, it is possible to further improve the cooling performance of the ECU 62 and hence to produce an extremely large effect. The partition wall 350 forms four spaces. The partition wall 636 closes the exits of the respective spaces and forms a gap 637 only in the top and hence the working fluid flows out of the gap 637.

In the plurality of embodiments described above, the linear solenoid valve is applied to the actuator but it is also recommended that a duty solenoid valve subjected to a duty ratio control be applied to the actuator. Further, it is also recommended that a solenoid valve for controlling the line pressure be used as the actuator, for example, the solenoid valve 44 is used as the actuator.

In addition, in the plurality of embodiments described above, the hydraulic pressure control apparatus in accordance with the present invention is applied to the hydraulic pressure control apparatus for an automatic transmission, but it is possible to apply the hydraulic pressure control apparatus in accordance with the present invention to the hydraulic pressure control apparatus for a continuously variable transmission and also a hydraulic pressure control apparatus for the other machinery such as a tool machine and the like.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A hydraulic pressure control apparatus comprising:
   hydraulic pressure control member which adjusts or switches hydraulic pressure of fluid applied to an object to be controlled;
   an upper case and a lower case that receive the hydraulic pressure control member and have an inside wall for forming a passage for the fluid; and
   a plate member interposed between the upper case and the lower case, the plate member being made of non-porous material and having a plurality of through holes to define a filter that filters the fluid flowing through the passage,
   the upper case and the lower case cooperating with the plate member in forming the passage for the fluid,
   wherein the plate member includes at least one communication hole for forming the passage for the fluid in cooperation with the upper case and the lower case, and
   wherein said communication hole has a diameter greater than a diameter of a said through hole.

2. A hydraulic pressure control apparatus according to claim 1, wherein the hydraulic pressure control member has an actuator that receives the hydraulic pressure of a working fluid as a supply pressure and operates in response to a switching control signal to output a control pressure, and wherein the filter is provided directly on the upstream side of the actuator.

3. A hydraulic pressure control apparatus according to claim 2, wherein the hydraulic pressure control member has a valve that is operated by the control pressure outputted by the actuator to control the supply or discharge of the hydraulic pressure applied to the object to be controlled.

4. A hydraulic pressure control apparatus according to claim 1, further comprising a magnet that is provided on the inside wall of the passage on the upstream side of the filter.

5. A hydraulic pressure control apparatus according to claim 1, wherein the plurality of through holes are formed in the plate member by a laser.

6. A hydraulic pressure control apparatus according to claim 1, wherein the through holes have a diameter of 0.002 mm to 0.2 mm.

7. A hydraulic pressure control apparatus comprising:
   hydraulic pressure control member which adjusts or switches hydraulic pressure of fluid applied to an object to be controlled;
   an upper case and a lower case that receive the hydraulic pressure control member and have an inside wall for forming a passage for the fluid; and
   a plate member interposed between the upper case and the lower case, the plate member being made of non-porous material and having a plurality of through holes to define a filter that filters the fluid flowing through the passage,
   the upper case and the lower case cooperating with the plate member in forming the passage for the fluid,
   wherein the plate member includes at least one communication hole for forming the passage for the fluid in cooperation with the upper case and the lower case, and
   wherein said communication hole has a diameter substantially corresponding to a diameter of said passage as defined in at least one of said upper case and said lower case.

* * * * *